United States Patent
Aimatsu

(10) Patent No.: US 12,209,186 B2
(45) Date of Patent: Jan. 28, 2025

(54) PIGMENT COMPOSITION, IDENTIFICATION MEDIUM, AND METHOD FOR DETERMINING AUTHENTICITY

(71) Applicant: ZEON CORPORATION, Tokyo (JP)

(72) Inventor: Masashi Aimatsu, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 467 days.

(21) Appl. No.: 17/629,861

(22) PCT Filed: Jul. 21, 2020

(86) PCT No.: PCT/JP2020/028316
§ 371 (c)(1),
(2) Date: Jan. 25, 2022

(87) PCT Pub. No.: WO2021/020243
PCT Pub. Date: Feb. 4, 2021

(65) Prior Publication Data
US 2022/0275213 A1    Sep. 1, 2022

(30) Foreign Application Priority Data
Jul. 30, 2019  (JP) .................................. 2019-140278

(51) Int. Cl.
*C09B 67/22*     (2006.01)
*B42D 25/364*    (2014.01)
(Continued)

(52) U.S. Cl.
CPC ........ *C09B 67/0034* (2013.01); *B42D 25/364* (2014.10); *B42D 25/391* (2014.10);
(Continued)

(58) Field of Classification Search
CPC . B42D 25/364; B42D 25/391; C08F 222/102; C09B 67/0034; C09B 67/0097; C09B 69/106; C09B 69/107
See application file for complete search history.

(56) References Cited

U.S. PATENT DOCUMENTS 6,217,792 B1   4/2001 Parri et al.
6,468,444 B1  10/2002 Meyer et al.
(Continued)

FOREIGN PATENT DOCUMENTS

| CN | 101479362 A | 7/2009 |
|----|-------------|--------|
| CN | 109564322 A | 4/2019 |

(Continued)

OTHER PUBLICATIONS

Jun. 28, 2023, the Extended European Search Report issued by the European Patent Office in the corresponding European Patent Application No. 20846442.0.
(Continued)

*Primary Examiner* — Gerard Higgins
(74) *Attorney, Agent, or Firm* — KENJA IP LAW PC

(57) ABSTRACT

A pigment composition including: a first cholesteric liquid crystal pigment; and a second cholesteric liquid crystal pigment, wherein: the first cholesteric liquid crystal pigment is a pigment having: a center wavelength of a selective reflection band within a wavelength range of 400 nm or more and 800 nm or less; and a selective reflection bandwidth of 150 nm or less; the second cholesteric liquid crystal pigment is a pigment having a selective reflection bandwidth of 200 nm or more within a wavelength range of 400 nm or more and 800 nm or less; the selective reflection band of the first cholesteric liquid crystal pigment and a selective reflection band of the second cholesteric liquid crystal pigment at least partially overlap with each other; and a containing amount of the first cholesteric liquid crystal pigment relative
(Continued)

to a total amount of the first cholesteric liquid crystal pigment and the second cholesteric liquid crystal pigment is more than 0% by weight and 30% by weight or less.

9 Claims, 1 Drawing Sheet

(51) Int. Cl.
    *B42D 25/391*     (2014.01)
    *C08F 222/10*     (2006.01)
    *C09B 67/02*     (2006.01)
    *C09B 69/10*     (2006.01)
    *C09D 11/037*     (2014.01)
    *C09D 11/101*     (2014.01)
    *G07D 7/1205*     (2016.01)

(52) U.S. Cl.
    CPC .... *C08F 222/1025* (2020.02); *C09B 67/0097* (2013.01); *C09B 69/106* (2013.01); *C09B 69/107* (2013.01); *C09D 11/037* (2013.01); *C09D 11/101* (2013.01); *G07D 7/1205* (2017.05)

(56) References Cited

U.S. PATENT DOCUMENTS

| | | |
|---|---|---|
| 2003/0137632 A1 | 7/2003 | Kawabata |
| 2010/0178508 A1 | 7/2010 | Kasch et al. |
| 2019/0184732 A1 | 6/2019 | Yakabe |

FOREIGN PATENT DOCUMENTS

| | | |
|---|---|---|
| EP | 1876216 A1 | 1/2008 |
| EP | 3502755 A1 | 6/2019 |
| JP | H0672962 A | 3/1994 |
| JP | 2000290315 A | 10/2000 |
| JP | 2003066214 A | 3/2003 |
| JP | 2003073600 A | 3/2003 |
| JP | 2003313187 A | 11/2003 |
| JP | 2003342219 A | 12/2003 |
| JP | 2004115414 A | 4/2004 |
| JP | 2005289881 A | 10/2005 |
| JP | 2007176870 A | 7/2007 |
| JP | 2009541047 A | 11/2009 |
| WO | 9800428 A1 | 1/1998 |
| WO | 2018034215 A1 | 2/2018 |

OTHER PUBLICATIONS

Sep. 24, 2020, International Search Report issued in the International Patent Application No. PCT/JP2020/028316.

Feb. 1, 2022, International Preliminary Report on Patentability issued in the International Patent Application No. PCT/JP2020/028316.

PIGMENT COMPOSITION, IDENTIFICATION MEDIUM, AND METHOD FOR DETERMINING AUTHENTICITY

FIELD

The present invention relates to a pigment composition, an identification medium, and a method for determining authenticity.

BACKGROUND

It is a general practice to attach an identification medium to an article, to identify the authenticity of the identification medium for, e.g., preventing counterfeiting of the article.

A cholesteric liquid crystal resin is obtained by causing a liquid crystal compound to have a cholesteric orientation and curing the liquid crystal compound while maintaining such an orientation. Such a cholesteric liquid crystal resin has a function of separating circularly polarized light that is a function of reflecting one of clockwise circularly polarized light and counterclockwise circularly polarized light, and allowing the other circularly polarized light to pass therethrough. For the cholesteric liquid crystal resin, it is known that a wavelength of the reflected circularly polarized light is shifted toward a shorter wavelength as a viewing angle θ with respect to the front direction increases. Such a characteristic can be utilized to identify the authenticity of the identification medium using the cholesteric liquid crystal resin.

An anti-counterfeit printed matter containing the cholesteric liquid crystal resin as a pigment has been known as an example of using such a cholesteric liquid crystal resin (see Patent Literature 1).

CITATION LIST

Patent Literature

Patent Literature 1: Japanese Patent Application Laid-Open No. 2003-73600 A

SUMMARY

Technical Problem

In the anti-counterfeit printed matter described in Patent Literature 1, there is provided a printed layer using an ink containing one of, or both, a clockwise polarization pigment that reflects a part of clockwise circularly polarized light of incident light, and a counterclockwise polarization pigment that reflects a part of counterclockwise circularly polarized light of the incident light. Whether the anti-counterfeit printed matter is authentic or not can be determined by naked-eye observation via an authenticity determination filter using a circular polarizing plate. Thus, an authenticity determination can be made with a simple device.

Counterfeiting techniques are being improving in recent years. Accordingly, there is a demand for an identification medium with an improved anti-counterfeit effect.

Solution to Problem

As a result of studies conducted to resolve the aforementioned problem, the present inventor has found the following: when a pigment composition containing a specific first cholesteric liquid crystal pigment and a specific second cholesteric liquid crystal pigment with a specific ratio is used, a color originating from the first cholesteric liquid crystal pigment is visually unrecognized or is difficult to be visually recognized under naked-eye observation, but can be made visually recognizable under microscopic observation, whereby it is possible to improve an anti-counterfeit effect. Specifically, the present inventor has found that such an effect can be obtained when a cholesteric liquid crystal pigment which has a center wavelength of a selective reflection band within a wavelength range of 400 nm or more and 800 nm or less, and a selective reflection bandwidth of 150 nm or less is used as the first cholesteric liquid crystal pigment, and a cholesteric liquid crystal pigment which has a selective reflection bandwidth of 200 nm or more within a wavelength range of 400 nm or more and 800 nm or less is used as the second cholesteric liquid crystal pigment. That is, the present invention provides the following.

<1> A pigment composition comprising: a first cholesteric liquid crystal pigment; and a second cholesteric liquid crystal pigment, wherein:
  the first cholesteric liquid crystal pigment is a pigment having: a center wavelength of a selective reflection band within a wavelength range of 400 nm or more and 800 nm or less; and a selective reflection bandwidth of 150 nm or less;
  the second cholesteric liquid crystal pigment is a pigment having a selective reflection bandwidth of 200 nm or more within a wavelength range of 400 nm or more and 800 nm or less;
  the selective reflection band of the first cholesteric liquid crystal pigment and a selective reflection band of the second cholesteric liquid crystal pigment at least partially overlap with each other; and
  a containing amount of the first cholesteric liquid crystal pigment relative to a total amount of the first cholesteric liquid crystal pigment and the second cholesteric liquid crystal pigment is more than 0% by weight and 30% by weight or less.

<2> The pigment composition according to <1>, wherein the containing amount of the first cholesteric liquid crystal pigment relative to the total amount of the first cholesteric liquid crystal pigment and the second cholesteric liquid crystal pigment is 20% by weight or less.

<3> The pigment composition according to <1> or <2>, wherein a selective reflection bandwidth of the first cholesteric liquid crystal pigment is 120 nm or less.

<4> The pigment composition according to any one of <1> to <3>, wherein the first cholesteric liquid crystal pigment and the second cholesteric liquid crystal pigment have an identical twist direction.

<5> The pigment composition according to any one of <1> to <3>, wherein the first cholesteric liquid crystal pigment and the second cholesteric liquid crystal pigment have twist directions that are different each other.

<6> The pigment composition according to any one of <1> to <5>, wherein:
  at least one of the first cholesteric liquid crystal pigment and the second cholesteric liquid crystal pigment is in flake form, and
  an average particle diameter of the flakes is 20 μm or more and 120 μm or less.

<7> An ink composition comprising: the pigment composition according to any one of <1> to <6>; and a binder resin.

<8> An identification medium comprising: a binder resin; and a pigment dispersed in the binder resin, wherein the pigment is the pigment composition according to any one of <1> to <6>.

<9> A method for determining authenticity of the identification medium according to <8>, comprising:
   a step 1 of observing reflected light from the identification medium via a counterclockwise circular polarizing plate and a clockwise circular polarizing plate to determine whether a difference exists in at least one of hue, lightness, and saturation of the reflected light;
   a step 2 of observing the identification medium by naked eye to determine whether a color originating from the second cholesteric liquid crystal pigment is visually recognizable; and
   a step 3 of observing the identification medium with a microscope to determine whether a color originating from the first cholesteric liquid crystal pigment and the color originating from the second cholesteric liquid crystal pigment are both visually recognizable.

Advantageous Effects of Invention

According to the present invention, a pigment composition having an improved anti-counterfeit effect, an ink composition and an identification medium using such a pigment composition, and a method for identifying the authenticity of the aforementioned identification medium can be provided.

DESCRIPTION OF EMBODIMENTS

Figure 1:
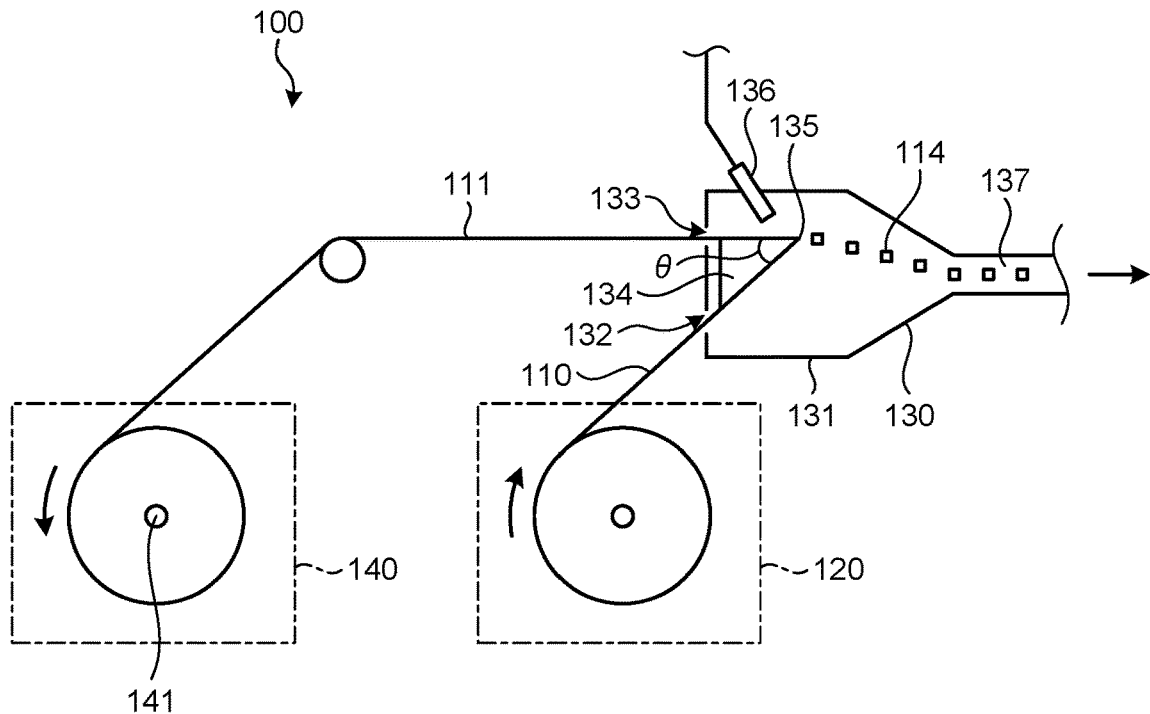
FIG. 1 is a front view schematically illustrating a device for producing flaked pieces of a resin thin film used in the production of a pigment composition of the present invention.

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, a "composition" encompasses not only a mixture of two or more substances but also a material consisting of a single substance, and an "agent" encompasses a mixture of two or more substances in addition to a material consisting of a single substance, unless otherwise specified.

In the following description, the term "(meth)acrylate" means "acrylate" or "methacrylate", or both unless otherwise specified. The term "(meth)acryl-" means "acryl-" or "methacryl-", or both. The term "(thio)epoxy" means "epoxy" or "thioepoxy", or both. The term "iso(thio)cyanate" means "isocyanate" or "isothiocyanate", or both.

(1. Pigment Composition)

The pigment composition according to the present invention includes a first cholesteric liquid crystal pigment, and a second cholesteric liquid crystal pigment. The first cholesteric liquid crystal pigment is a pigment having: a center wavelength of a selective reflection band within a wavelength range of 400 nm or more and 800 nm or less; and a selective reflection bandwidth of 150 nm or less. The second cholesteric liquid crystal pigment is a pigment having a selective reflection bandwidth of 200 nm or more within a wavelength range of 400 nm or more and 800 nm or less. The selective reflection band of the first cholesteric liquid crystal pigment and the selective reflection band of the second cholesteric liquid crystal pigment at least partially overlap with each other. The containing amount of the first cholesteric liquid crystal pigment relative to the total amount of the first cholesteric liquid crystal pigment and the second cholesteric liquid crystal pigment is more than 0% by weight and 30% by weight or less.

Each of the first cholesteric liquid crystal pigment and the second cholesteric liquid crystal pigment is constituted of a cholesteric liquid crystal resin.

The "cholesteric liquid crystal resin" refers to a resin material having cholesteric regularity, and means that molecules or portions of molecules that constitute the resin are disposed so as to have cholesteric regularity in the resin.

The expression that the molecules in the resin "have cholesteric regularity" as used herein means that the molecules in the resin have specific regularity that is to be described below. When molecules in a resin have cholesteric regularity, the molecules are disposed in the resin in a manner of forming many molecular layers. In each of the molecular layers, molecules are disposed with their molecular axes being directed to a certain orientation direction. Relative to an orientation direction in a first plane in a layer of the resin, an orientation direction in a subsequent second plane that is stacked on the first plane is shifted with a small angle. An orientation direction in a subsequent third plane that is further stacked on the second plane is further shifted from the orientation direction in the second plane with a small angle. In this manner, in a plurality of the planes disposed in a stacked manner, the angles of the molecular axes in these planes are sequentially shifted (twisted). Such a structure with the directions of the molecular axes being sequentially twisted results in an optically chiral structure.

A cholesteric liquid crystal resin having an optically chiral structure usually has a selective reflection function for circularly polarized light that is a function of selectively reflecting circularly polarized light. The expression that a cholesteric liquid crystal resin "selectively reflects" light within a specific wavelength range means that the cholesteric liquid crystal resin reflects one of circularly polarized components in unpolarized light (i.e., natural light) in the specific wavelength range, and allows the other circularly polarized component to pass therethrough. The "selective reflection band" in the present invention refers to a wavelength range of circularly polarized light that is selectively reflected. The "selective reflection bandwidth" in the present invention refers to the width of the selective reflection band. Specifically, the "selective reflection bandwidth" may be a half width of the selective reflection band.

(Selective Reflection Band of Cholesteric Liquid Crystal Pigment)

In the present invention, the selective reflection band of the first cholesteric liquid crystal pigment and the selective reflection band of the second cholesteric liquid crystal pigment at least partially overlap with each other. The range in which the selective reflection band of the first cholesteric liquid crystal pigment and the selective reflection band of the second cholesteric liquid crystal pigment overlap with each other is preferably 80% or more, more preferably 90% or more, and still more preferably 100%, relative to the entire selective reflection band of the first cholesteric liquid crystal pigment. The range in which the selective reflection band of the first cholesteric liquid crystal pigment and the selective reflection band of the second cholesteric liquid crystal pigment overlap with each other is preferably 10% or more, and more preferably 20% or more, and is preferably 50% or less, and more preferably 40% or less, relative to the entire selective reflection band of the second cholesteric liquid crystal pigment. When the range in which the selective reflection band of the first cholesteric liquid crystal pigment and the selective reflection band of the second cholesteric liquid crystal pigment overlap with each other is equal to or more than the aforementioned lower limit value relative to the entire selective reflection band of the first cholesteric liquid crystal pigment, it becomes difficult to recognize a difference between a color originating from the first cholesteric liquid crystal pigment and a color originating from the second cholesteric liquid crystal pigment under naked-eye observation, and thereby the anti-counterfeit effect is enhanced. When the range in which the selective reflection band of the first cholesteric liquid crystal pigment and the selective reflection band of the second cholesteric liquid crystal pigment overlap with each other is equal to or more than the aforementioned lower limit value relative to the entire selective reflection band of the second cholesteric liquid crystal pigment, it becomes difficult to recognize a difference between the color originating from the first cholesteric liquid crystal pigment and the color originating from the second cholesteric liquid crystal pigment under naked-eye observation, and thereby the anti-counterfeit effect is enhanced. When such a range is equal to or less than the aforementioned upper limit value, it becomes easier to recognize a difference between the color of the first cholesteric pigment and the color of the second cholesteric liquid crystal pigment under microscopic observation.

According to the present invention, the selective reflection bandwidth of the first cholesteric liquid crystal pigment is 150 nm or less, and the selective reflection bandwidth of the second cholesteric liquid crystal pigment is 200 nm or more. That is, the first cholesteric liquid crystal pigment is a (narrowband) cholesteric liquid crystal pigment having a selective reflection bandwidth narrower than that of the second cholesteric liquid crystal pigment, and the second cholesteric liquid crystal pigment is a (wideband) cholesteric liquid crystal pigment having a selective reflection bandwidth wider than that of the first cholesteric liquid crystal pigment. When an identification medium using a cholesteric liquid crystal pigment having a narrow selective reflection bandwidth is observed under natural light, appearance having color corresponding to the reflection band can be visually recognized. When an identification medium using a cholesteric liquid crystal pigment having a wide selective reflection bandwidth is observed under natural light, appearance having a silver color close to a specular surface can be visually recognized. According to the present invention, the pigment composition contains the first cholesteric liquid crystal pigment having a selective reflection bandwidth of 150 nm or less, and the second cholesteric liquid crystal pigment having a selective reflection bandwidth of 200 nm or more. Thus, when an identification medium using such a pigment composition is observed under natural light, it becomes easier to determine which one of the first cholesteric liquid crystal pigment and the second cholesteric liquid crystal pigment a visually-recognizable color originates from.

The selective reflection bandwidth of the first cholesteric liquid crystal pigment is preferably 120 nm or less, and more preferably 110 nm or less, and is preferably 30 nm or more, and more preferably 50 nm or more. The selective reflection bandwidth of the second cholesteric liquid crystal pigment is preferably 200 nm or more, and more preferably 300 nm or more. Although no particular upper limit is set for the selective reflection bandwidth of the second cholesteric liquid crystal pigment, the upper limit of the selective reflection bandwidth of the second cholesteric liquid crystal pigment is preferably 2,000 nm or less, and more preferably 1,000 nm or less.

The first cholesteric liquid crystal pigment has the center wavelength of the selective reflection band within a wavelength range of 400 nm or more and 800 nm or less. In the present invention, the center wavelength of the selective reflection band for each of the cholesteric liquid crystal pigments may be the center wavelength of a region corresponding to the half width of that selective reflection band. Specifically, the reflection spectrum of the cholesteric liquid crystal pigment at an incidence angle of 5° is measured; a peak having the maximum strength and a base having the minimum strength are determined in the obtained reflection spectrum; and a wavelength $\lambda 1$ on the shorter wavelength side of the peak and a wavelength $\lambda 2$ on the longer wavelength side of the peak, indicating a strength equal to the minimum strength+(the maximum strength−the minimum strength)/2, are obtained. The average value $(\lambda 1+\lambda 2)/2)$ of these wavelengths is further obtained, and the obtained average value may be used as the center wavelength. The selective reflection band of each cholesteric liquid crystal pigment in this case is a range ($\lambda 1$ to $\lambda 2$) from the wavelength $\lambda 1$ on the shorter wavelength side of the peak to the wavelength $\lambda 2$ on the longer wavelength side of the peak, indicating the strength equal to the minimum strength+(the maximum strength−the minimum strength)/2 in the reflection spectrum, and the selective reflection bandwidth of each cholesteric liquid crystal pigment is a difference $(\lambda 2-\lambda 1)$ between the wavelength $\lambda 2$ on the longer wavelength side and the wavelength $\lambda 1$ on the shorter wavelength side.

If the first cholesteric liquid crystal pigment and the second cholesteric liquid crystal pigment are those produced by making the cholesteric liquid crystal resin into powder or fiber form, the center wavelength of the selective reflection band of each cholesteric liquid crystal pigment is a center wavelength of a selective reflection band observed when a thin film containing that pigment is formed.

The center wavelength $\lambda$ (nm) of the selective reflection band when a thin film containing each cholesteric liquid crystal pigment is observed at a viewing angle $\theta$ with respect to the front direction is expressed by the following equation, where n denotes an average refractive index of a cholesteric liquid crystal resin, and P (nm) denotes a pitch length of a chiral structure (helical structure) possessed by the cholesteric liquid crystal resin.

$$\lambda = n \times P \times \cos \theta$$

Accordingly, the center wavelength $\lambda$ of the selective reflection band when the thin film containing each cholesteric liquid crystal pigment is observed at a viewing angle $\theta$ with respect to the front direction ($\cos \theta < 1$) is a shorter wavelength as compared to a center wavelength $\lambda$ of a selective reflection band when observed in the front direction ($\cos \theta = 1$). The front direction of the thin film containing the cholesteric liquid crystal pigment refers to a normal direction of the thin film when the thin film containing the cholesteric liquid crystal pigment is formed.

The center wavelength $\lambda$ of the selective reflection band when the first cholesteric liquid crystal pigment and the second cholesteric liquid crystal pigment are observed at a viewing angle θ with respect to the front direction can be increased by increasing the pitch length P of the chiral structure (helical structure) and can be decreased by decreasing the pitch length P, for example.

Examples of a method for adjusting the pitch length of each cholesteric liquid crystal resin may include a method for adjusting a type of chiral agent, and a method for adjusting an amount of a chiral agent.

(Containing Amount of First Cholesteric Liquid Crystal Pigment)

In the present invention, the containing amount of the first cholesteric liquid crystal pigment relative to the total amount of the first cholesteric liquid crystal pigment and the second cholesteric liquid crystal pigment is more than 0% by weight and 30% by weight or less. The containing amount of the first cholesteric liquid crystal pigment relative to the total amount of the first cholesteric liquid crystal pigment and the second cholesteric liquid crystal pigment is preferably 10% by weight or more, and more preferably 15% by weight or more, and is preferably 25% by weight or less, and more preferably 20% by weight or less.

When the containing amount of the first cholesteric liquid crystal pigment relative to the total amount of the first cholesteric liquid crystal pigment and the second cholesteric liquid crystal pigment is equal to or less than the aforementioned upper limit value, the color originating from the first cholesteric liquid crystal pigment is visually unrecognized or difficult to be visually recognized, but the color originating from the second cholesteric liquid crystal pigment can be visually recognized under naked-eye observation. The color originating from the first cholesteric liquid crystal pigment and the color originating from the second cholesteric liquid crystal pigment can be both visually recognized under microscopic observation. This can improve the anti-counterfeit effect.

When the containing amount of the first cholesteric liquid crystal pigment relative to the total amount of the first cholesteric liquid crystal pigment and the second cholesteric liquid crystal pigment is more than 0% by weight, the color originating from the first cholesteric liquid crystal pigment together with the color originating from the second cholesteric liquid crystal pigment can be visually recognized under microscopic observation.

From the viewpoint of achieving good dispersion when the pigment composition is produced as an ink composition, at least one of the first cholesteric liquid crystal pigment and the second cholesteric liquid crystal pigment is preferably in flake form. When the first cholesteric liquid crystal pigment, the second cholesteric liquid crystal pigment, or the both cholesteric liquid crystal pigments are in flake form, the average particle diameter of the flakes is preferably 20 μm or more, and more preferably 30 μm or more, and is preferably 120 μm or less, more preferably 100 μm or less, and most preferably 80 μm or less. When the average particle diameter of the flakes is equal to or more than the aforementioned lower limit value, decorativeness can be obtained. When the average particle diameter of the flakes is equal to or less than the aforementioned upper limit value, printability can be obtained.

For the average particle diameter of the flakes, a particle size distribution may be measured using a laser scattering method, and the average particle diameter may be measured from the particle size distribution, for example.

In the particle size distribution, a particle diameter corresponding to a cumulative volume of 50% may be adopted as an average particle diameter. In the present application, the average particle diameter of the flakes refers to a volume average unless otherwise indicated.

(Twist Direction of Cholesteric Liquid Crystal Pigment)

The first cholesteric liquid crystal pigment and the second cholesteric liquid crystal pigment may have an identical twist direction, or may have twist directions that are different from each other. Such a twist direction may be determined by observing, via clockwise and counterclockwise circular polarizing plates, reflected light that is caused when unpolarized light is made incident on a sample containing each cholesteric liquid crystal pigment. Specifically, the twist direction may be determined by irradiating the sample with unpolarized light from the observer's side, and observing reflected light reflected at the sample and reaching the observer's side. When such reflected light is clockwise circularly polarized light, the twist direction can be determined as a clockwise twist. When such reflected light is counterclockwise circularly polarized light, the twist direction can be determined as a counterclockwise twist.

(Material for Cholesteric Liquid Crystal Pigment)

The cholesteric liquid crystal resin which serves as a material for the first cholesteric liquid crystal pigment is a cured product of a first liquid crystal composition containing a liquid crystal compound. The cholesteric liquid crystal resin which serves as a material for the second cholesteric liquid crystal pigment is a cured product of a second liquid crystal composition containing a liquid crystal compound.

As the liquid crystal compound contained in the first liquid crystal composition and the second liquid crystal composition, a liquid crystal compound having polymerizability is preferable. A liquid crystal composition containing a liquid crystal compound having polymerizability can be easily cured while maintaining an orientation state thereof by effecting polymerization of the liquid crystal compound.

As the liquid crystal compound, a cholesteric liquid crystal compound may be used. The cholesteric liquid crystal compound is a compound that is capable of exhibiting cholesteric liquid crystallizability. By using a liquid crystal composition containing such a cholesteric liquid crystal compound and curing the liquid crystal composition in a state of exhibiting a cholesteric liquid crystal phase, a cholesteric liquid crystal resin which is a resin material having cholesteric regularity can be obtained.

As the liquid crystal compound contained in the first liquid crystal composition and the second liquid crystal composition, for example, a rod-like liquid crystal compound having two or more reactive groups in one molecule may be used. Examples of this rod-like liquid crystal compound may include compounds represented by the formula (1).

$$R^3\text{—}C^3\text{-}D^3\text{-}C^5\text{-}M\text{-}C^6\text{-}D^4\text{-}C^4\text{—}R^4 \quad (1)$$

In the formula (1), $R^3$ and $R^4$ are reactive groups, each independently representing a group selected from the group consisting of a (meth)acrylic group, a (thio) epoxy group, an oxetane group, a thietanyl group, an aziridinyl group, a pyrrole group, a vinyl group, an allyl group, a fumarate group, a cinnamoyl group, an oxazoline group, a mercapto group, an iso (thio) cyanate group, an amino group, a hydroxyl group, a carboxyl group, and an alkoxysilyl group. When the liquid crystal compound has these reactive groups, it is possible to obtain a cholesteric liquid crystal resin having high strength when the liquid crystal composition is cured.

In the formula (1), $D^3$ and $D^4$ each independently represent a group selected from the group consisting of a single bond, a linear or branched alkyl group of 1 to 20 carbon atoms, and a linear or branched alkylene oxide group of 1 to 20 carbon atoms.

In the formula (1), $C^3$ to $C^6$ each independently represent a group selected from the group consisting of a single bond, —O—, —S—, —S—S—, —Co—, —CS—, —OCO—, —CH$_2$—, —OCH$_2$—, —CH=N—N=CH—, —NHCO—, —O—(C=O)—O—, —CH$_2$—(C=O)—O—, and —CHO—(C=O)—.

In the formula (1), M represents a mesogen group. In particular, M represents a group obtained by bonding two to four same or different skeletons selected from the group consisting of azomethines, azoxies, phenyls, biphenyls, terphenyls, naphthalenes, anthracenes, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles, which may or may not be substituted, by a bonding group such as —O—, —S—, —S—S—, —CO—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—.

Examples of the substituents which the mesogen group M may have may include a halogen atom, an alkyl group of 1 to 10 carbon atoms optionally having a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, and —O—C(=O)—NR$^5$R$^7$. Herein, R$^5$ and R$^7$ represent a hydrogen atom or an alkyl group of 1 to 10 carbon atoms. When R$^5$ and R$^7$ are an alkyl group, the alkyl group may have therein intervening —O—, —S—, —O—C(=O)—, —C(=O)—O—, —O—C(=O)—O—, —NR$^6$—C(=O)—, —C(=O)—NR$^6$—, —NR$^6$—, or —C(=O)— (except for cases where two or more adjacently intervening —O—'s or —S—'s are present). Herein, R$^6$ represents a hydrogen atom or an alkyl group of 1 to 6 carbon atoms.

Examples of the substituents in the above-mentioned "alkyl group of 1 to 10 carbon atoms optionally having a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

It is preferable that the rod-like liquid crystal compound has an asymmetric structure. Herein, the asymmetric structure refers to a structure in which R$^3$—C$^3$-D$^3$-C$^5$-and-C$^6$-D$^4$-C$^4$—R$^4$ differ from each other in the formula (1) with the mesogen group M serving as its center. By using the compound with an asymmetric structure as the rod-like liquid crystal compound, it is possible to further enhance orientation uniformity.

Preferable specific examples of the rod-like liquid crystal compound may include the following compounds (B1) to (B9). As these compounds, one type thereof may be solely used, and two or more types thereof may also be used in combination at any ratio.

(Chemical formula 1)

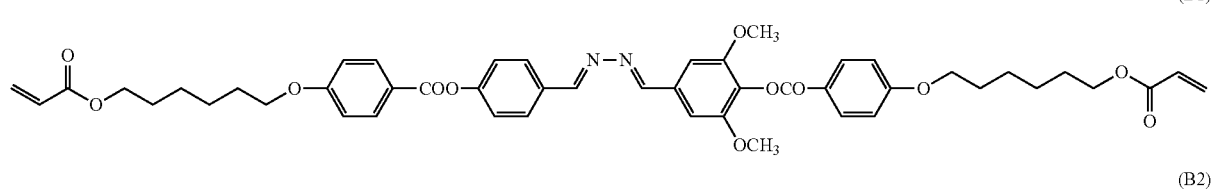

(B1)

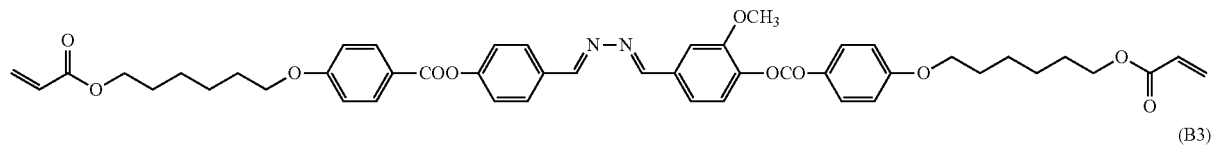

(B2)

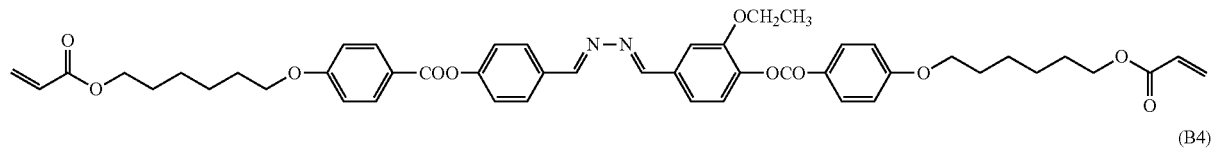

(B3)

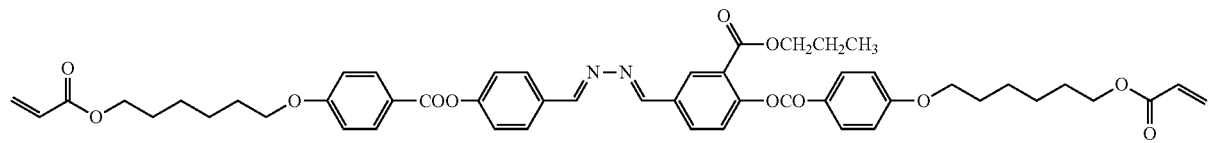

(B4)

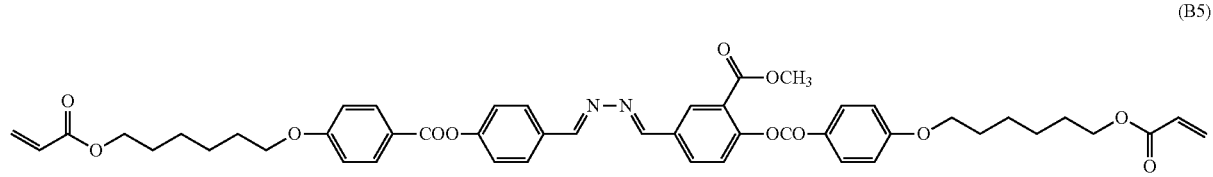

(B5)

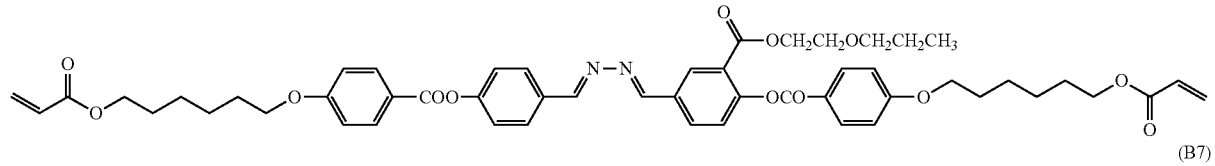

(B6)

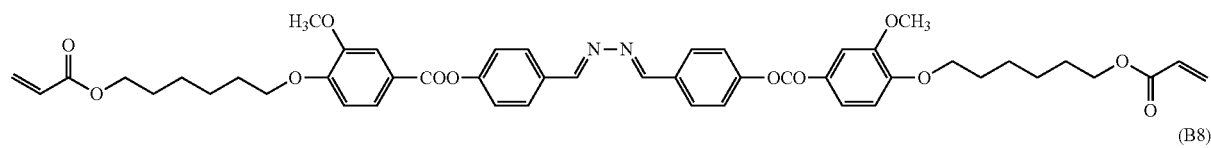

(B7)

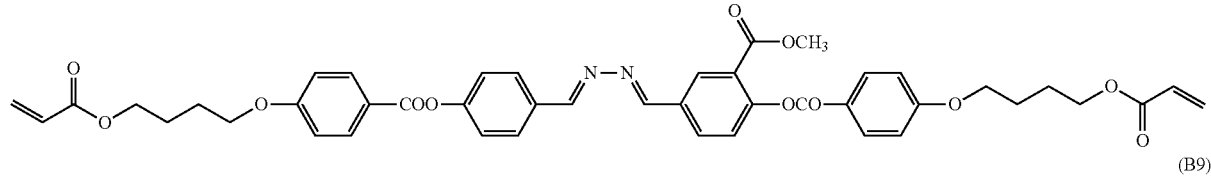

(B8)

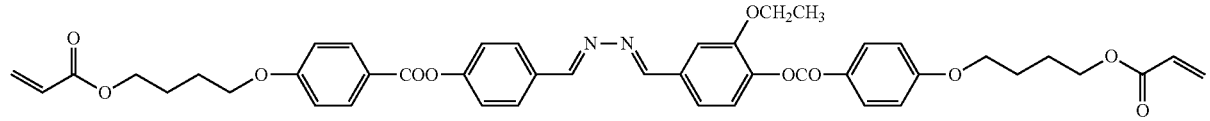

(B9)

The first liquid crystal composition and/or the second liquid crystal composition preferably contains a compound represented by the above-mentioned formula (1) as a liquid crystal compound, and more preferably contains one or more types selected from the above-mentioned compounds (B1) to (B9).

In addition to the liquid crystal compound, the first liquid crystal composition and/or the second liquid crystal composition may contain a compound represented by the following formula (2). The compound of the formula (2) may function as an orientation aid.

In the formula (2), $R^1$ and $R^2$ are each independently selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meta) acrylic group which may include an optional bonding group as an intervening group, an epoxy group, a mercapto group, an isocyanate group, an amino group, and a cyano group.

The alkyl group and the alkylene oxide group may be unsubstituted or substituted with one or more halogen atoms. In addition, the halogen atom, hydroxyl group, carboxyl group, (meta) acrylic group, epoxy group, mercapto group, isocyanate group, amino group, and cyano group may be bonded to an alkyl group of 1 to 2 carbon atoms and an alkylene oxide group.

Preferable examples of $R^1$ and $R^2$ may include a halogen atom, a hydroxyl group, a carboxyl group, a (meth)acrylic group, an epoxy group, a mercapto group, an isocyanate group, an amino group, and a cyano group.

Furthermore, at least one of $R^1$ and $R^2$ is preferably a reactive group. When the compound of the formula (2) has a reactive group as at least one of $R^1$ and $R^2$, the compound represented by the formula (2) is fixed in the cholesteric liquid crystal resin at the time of curing, so that a stronger resin can be formed. Herein, examples of the reactive group may include a carboxyl group, a (meth)acrylic group, an epoxy group, a mercapto group, an isocyanate group, and an amino group.

In the formula (2), $A^1$ and $A^2$ each independently represent a group selected from the group consisting of a 1,4-phenylene group, a 1,4-cyclohexylene group, a cyclohexene-1,4-ylene group, a 4,4'-biphenylene group, a 4,4'-bicyclohexylene group, and a 2,6-naphthylene group. The 1,4-phenylene group, 1,4-cyclohexylene group, cyclohexene-1,4-ylene group, 4,4'-biphenylene group, 4,4'-bicyclohexylene group, and 2,6-naphthylene group are not substituted or may be substituted with one or more substituents such as a halogen atom, a hydroxyl group, a carboxyl group, a cyano group, an amino group, a C1-C10 alkyl group and a halogenated alkyl group. When two or more substituents are present in each of $A^1$ and $A^2$, they may be the same as, or different from, each other.

Particularly preferable examples as $A^1$ and $A^2$ may include groups selected from the group consisting of a 1,4-phenylene group, a 4,4'-biphenylene group, and a 2,6-naphthylene group. These aromatic ring skeletons are relatively rigid compared to alicyclic skeletons, and the affinity of the groups to mesogens of the rod-like liquid crystal compound is high and orientation uniformity becomes higher.

In the formula (2), B is selected from the group consisting of a single bond, —O—, —S—, —S—S—, —Co—, —CS—, —OCO—, —CH$_2$—, —OCH$_2$—, —CH=N—N=CH—, —NHCO—, —O—(C=O)—O—, —CH$_2$—(C=O)—O—, and —CH$_2$O—(C=O)—.

Particularly preferable examples as B may include a single bond, —O—(C=O)—, and —CH=N—N=CH—.

Particularly preferable specific examples of the compound represented by the formula (2) may include the following compounds (A1) to (A10). As the compounds of the formula (2), one type thereof may be solely used, and two or more types thereof may also be used in combination at any ratio.

Among the following compounds (A1) to (A10), one or more types selected from the compounds (A2) and (A10) are particularly preferable. The compounds (A2) and (A10) can reduce the temperature at which the liquid crystal phase in the liquid crystal composition is exhibited, and can maintain a wider temperature range in which the liquid crystal phase of the liquid crystal compound is exhibited.

(Chemical formula 2)

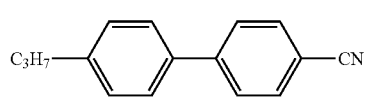

(A1)

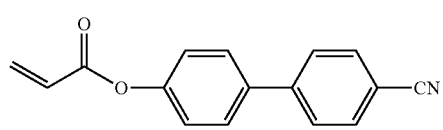

(A2)

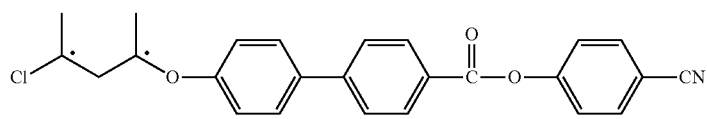

(A3)

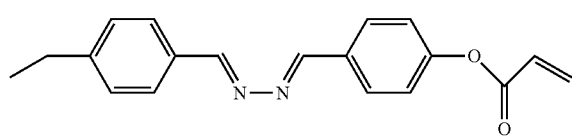

(A4)

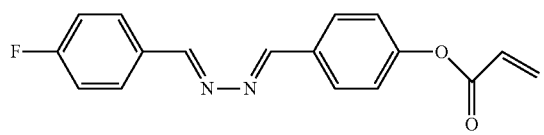

(A5)

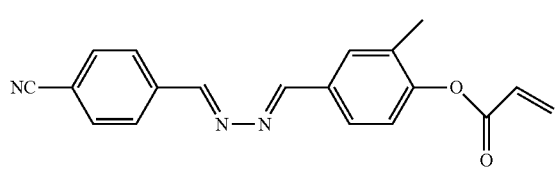

(A6)

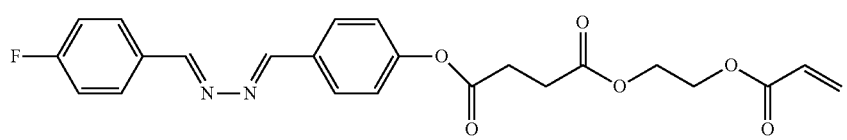

(A7)

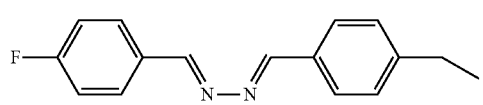

(A8)

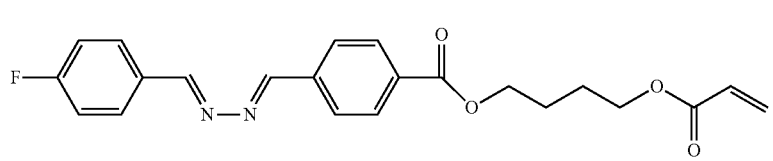

(A9)

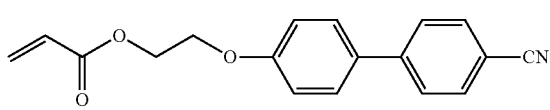

(A10)

In the above-mentioned compound (A3), "*" represents a chiral center.

In the first liquid crystal composition or the second liquid crystal composition, the weight ratio represented by (total weight of the compound represented by the formula (2))/(total weight of the rod-like liquid crystal compound) is preferably 0.05 or more, more preferably 0.1 or more, and particularly preferably 0.15 or more, and is preferably 1 or less, more preferably 0.65 or less, and particularly preferably 0.55 or less. By setting the weight ratio to the lower limit value or more of the above-mentioned range, orientation uniformity of the liquid crystal composition can be enhanced. In addition, by setting the weight ratio to the upper limit value or less, orientation uniformity can be enhanced. Further, stability of the liquid crystal phase of the liquid crystal composition can be increased. Herein, the total weight of the compound represented by the formula (2) indicates, in a case where only one type of the compound represented by the formula (2) is used, the weight of the compound, and indicates, in a case where two or more types thereof are used, the total weight of them. Similarly, the total weight of the rod-like liquid crystal compound indicates, in a case where only one type of the rod-like liquid crystal compound is used, the weight of the compound, and indicates, in a case where two or more types thereof are used, the total weight of them.

In a case where the compound represented by the formula (2) and the rod-like liquid crystal compound are used in combination, the molecular weight of the compound represented by the formula (2) is preferably less than 600, and the molecular weight of the rod-like liquid crystal compound is preferably 600 or more. With this configuration, the compound represented by the formula (2) can enter into the gap of the rod-like liquid crystal compound having a molecular weight larger than that of the compound represented by the formula (2), and orientation uniformity can thereby be improved.

The first liquid crystal composition and the second liquid crystal composition may each contain a chiral agent. Usually, the twist direction of the cholesteric liquid crystal resin may be appropriately selected by choosing the type and structure of the chiral agent to be used. Specific examples of the chiral agent that may appropriately be used may include those described in Japanese Patent Application Laid-Open No. 2005-289881 A, Japanese Patent Application Laid-Open No. 2004-115414 A, Japanese Patent Application Laid-Open No. 2003-66214 A, Japanese Patent Application Laid-Open No. 2003-313187 A, Japanese Patent Application Laid-Open No. 2003-342219 A, Japanese Patent Application Laid-Open No. 2000-290315 A, Japanese Patent Application Laid-Open No. Hei. 6-072962 A, U.S. Pat. No. 6,468,444, International Publication No. 98/00428, Japanese Patent Application Laid-Open No. 2007-176870 A and the like, and, e.g., Paliocolor LC756 is available from BASF. As the chiral agent, compounds represented by the following formula (3) may be used. As the chiral agents, one type thereof may be solely used, and two or more types thereof may also be used in combination at any ratio.

(Chemical formula 3)

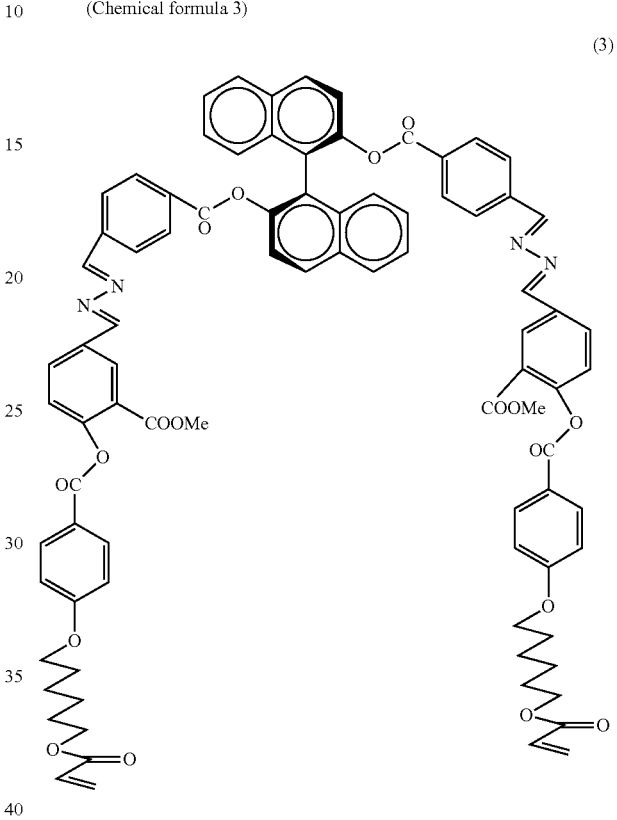

(3)

The amount of the chiral agent may be optionally set within a range in which the chiral agent does not decrease the desired optical performance. The specific amount of the chiral agent is usually 18 by weight to 60% by weight in the liquid crystal composition.

The first liquid crystal composition and the second liquid crystal composition may each contain a polymerization initiator. Examples of the polymerization initiator for use may include a photopolymerization initiator, and a compound capable of generating a radical or an acid by ultraviolet or visible light. Specific examples of the photopolymerization initiator may include benzoin, benzyl dimethyl ketal, benzophenone, biacetyl, acetophenone, Michler's ketone, benzyl, benzyl isobutyl ether, tetramethyl thiuram mono (di) sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, pp'-dichlorobenzophenone, pp'-bisdiethylaminobenzophenone, benzoin ethyl ether, benzoin isopropyl ether, benzoin n-propyl ether, benzoin n-butyl ether, diphenyl sulfide, bis (2,6-methoxybenzoyl)-2,4,4-trimethyl-pentylphosphine oxide, 2,4,6-trimethylbenzoyldiphenyl-phosphine oxide, bis (2,4,6-trimethylbenzoyl)-phenylphosphine oxide, 2-methyl-1(4-(methylthio)phenyl)-2-morpholinopropane-1-one, 2-benzyl-2-dimethylamino-1-(4-morpholinophenyl)-butane-1-one, anthracene benzophenone, α-chloroanthraquinone, diphenyldisulfide, hexachlorobutadiene, pentachlorobutadiene, octachlorobutene, 1-chlormethylnaphthalene, carbazoleoxime compounds such as 1,2-octanedione-1-(4-(phenylthio)-2-(o-benzoyloxime)) and 1-(9-ethyl-6-(2-methylbenzoyl)-9H-carbazol-3-yl)ethanone 1-(o-acetyloxime), (4-methylphenyl)(4-(2-methylpropyl)phenyl) iodonium hexafluorophosphate, 3-methyl-2-butynyltetramethylenesulfonium hexafluoroantimonate, and diphenyl-(p-phenylthiophenyl)sulfonium hexafluoroantimonate. As the polymerization initiator, IRGACURE 184 or IRGACURE OXE02 manufactured by BASF may also be used. As these compounds, one type thereof may be solely used, and two or more types thereof may also be used in combination at any ratio. Further, if necessary, a tertiary amine compound as a publicly known photosensitizer or polymerization accelerator may be used to control curability.

The amount of the polymerization initiator is preferably 0.03% by weight to 7% by weight in the liquid crystal composition. By setting the amount of the polymerization initiator to the lower limit value or more of the above-mentioned range, the degree of polymerization can be increased, so that mechanical strength of the cholesteric liquid crystal resin can be increased. By setting the amount to the upper limit value or less, the orientation of the liquid crystal compound can be improved, and thereby the liquid crystal phase of the liquid crystal composition can be stabilized.

The first liquid crystal composition and the second liquid crystal composition may each contain a surfactant as a leveling agent. As the surfactant, for example, those which do not inhibit orientation may be appropriately selected and used. Preferable examples of such a surfactant may include a nonionic surfactant containing a siloxane or a fluorinated alkyl group in a hydrophobic group moiety. Among these, an oligomer having two or more hydrophobic group moieties in one molecule is particularly suitable. Specific examples of these surfactants may include PolyFox PF-151N, PF-636, PF-6320, PF-656, PF-6520, PF-3320, PF-651, and PF-652 available from OMNOVA Solutions Inc.; Ftergent FTX-209F, FTX-208G, and FTX-204D available from Neos Co., Ltd.; and Surflon KH-40 and S420 available from AGC Seimi Chemical Co., Ltd. As the surfactants, one type thereof may be solely used, and two or more types thereof may also be used in combination at any ratio.

The amount of the surfactant is preferably set such that the amount of the surfactant in the cholesteric liquid crystal resin is 0.05% by weight to 3% by weight. By setting the amount of the surfactant to the lower limit value or more of the above-mentioned range, the orientation regulating force of the liquid crystal composition at the air interface can be increased, and thereby orientation defects can be prevented. By setting the amount to the upper limit value or less, it is possible to suppress occurrence of a surface defect caused by an excessive surfactant forming a micellar structure.

The first liquid crystal composition and the second liquid crystal composition may each further contain optional components if necessary. Examples of the optional component may include a polymerization inhibitor for improving pot life, an antioxidant for improving durability, an ultraviolet absorber, and a light stabilizer. As the optional components, one type thereof may be solely used, and two or more types thereof may also be used in combination at any ratio. The amount of these optional components may be freely set within a range in which the optional components do not decrease the desired optical performance.

The method for producing the first liquid crystal composition and the second liquid crystal composition is not particularly limited, and the first liquid crystal composition and the second liquid crystal composition each may be produced by mixing the above-mentioned respective components.

(Production of First Cholesteric Liquid Crystal Pigment)

The first cholesteric liquid crystal pigment may be produced by: applying a coating liquid containing the first liquid crystal composition and a solvent onto an appropriate supporting body; drying the coating liquid if necessary to form a layer of the first liquid crystal composition; curing the layer to form a thin film of a first cholesteric liquid crystal resin; peeling off the thin film of the first cholesteric liquid crystal resin from the supporting body; and crushing the thin film.

(Production of Thin Film of First Cholesteric Liquid Crystal Resin)

Prior to the application of the coating liquid containing the first liquid crystal composition, a surface of the supporting body may be subjected to a treatment to impart an orientation regulating force thereto. Examples of such a treatment may include a rubbing treatment on the surface of the supporting body, and a stretching treatment to a film of the supporting body. A surface treatment such as a corona treatment may be performed in order to enhance an affinity between the surface of the supporting body and the first liquid crystal composition.

As the supporting body, a film including a resin layer made of a resin may be used. Examples of the polymer contained in the resin constituting the resin layer may include a chain olefin polymer, a cycloolefin polymer, polycarbonate, polyester, polysulfone, polyether sulfone, polystyrene, polyvinyl alcohol, a cellulose acetate-based polymer, polyvinyl chloride, and polymethacrylate.

Herein, a resin containing one type of polymer solely may be used, and a resin containing two or more types of polymers in combination at any ratio may be used. Furthermore, the resin may contain an optional compounding agent as long as the advantageous effects of the present invention are not significantly impaired.

The supporting body may be a film having a single-layer structure including only one layer, or a film having a multi-layer structure including two or more layers. Thus, the supporting body may be a film including only the aforementioned resin layer, or a film including an optional layer in addition to the aforementioned resin layer.

From the viewpoint of achieving excellent orientation of the liquid crystal composition, for example, the supporting body may have an orientation film on the surface thereof. The orientation film may be made of a resin containing a polymer such as polyimide, polyvinyl alcohol, polyester, polyarylate, polyamideimide, polyetherimide, or polyamide, for example. As these polymers, one type thereof may be solely used, and two or more types thereof may also be used in combination at any ratio. The orientation film may be produced by applying a solution containing the aforementioned polymer, drying the solution, and subjecting the dried matter to a rubbing treatment.

The thickness of the orientation film is preferably 0.01 μm or more, and more preferably 0.05 μm or more, and is preferably 5 μm or less, and more preferably 1 μm or less.

The supporting body may be an unstretched film that has not been stretched, or a stretched film that has been stretched.

The supporting body may be an isotropic film, or an anisotropic film.

The supporting body may have one surface or both surfaces subjected to a surface treatment. By subjecting the supporting body to the surface treatment, adhesiveness of the supporting body with another layer directly formed on the surface of the supporting body can be improved. Examples of such a surface treatment may include an energy ray irradiation treatment and a chemical treatment.

The thickness of the supporting body is preferably 30 µm or more, and more preferably 60 µm or more, and is preferably 300 µm or less, and more preferably 200 µm or less from the viewpoint of its handleability at the time of production, the cost of materials, and reductions in thickness and weight.

The coating liquid containing the first liquid crystal composition may be applied using a known application method. Examples of such an application method may include an extrusion coating method, a direct gravure coating method, a reverse gravure coating method, a die coating method, a spin coating method, and a bar coating method.

An orientation treatment may be performed if necessary after the coating liquid containing the first liquid crystal composition is applied to form the layer of the first liquid crystal composition and before the curing step is performed. The orientation treatment may be performed, for example, by heating the layer of the first liquid crystal composition at 50 to 150° C. for 0.5 to 10 minutes. By performing such an orientation treatment, excellent orientation can be given to the liquid crystal compounds in the first liquid crystal composition.

The curing treatment on the layer of the first liquid crystal composition may be performed by one or more operations of energy ray irradiation. Examples of such an energy ray may include ultraviolet rays, visible light, and other electromagnetic waves. Specifically, the energy ray irradiation may be performed by irradiating the layer of the first liquid crystal composition with light having a wavelength of 200 to 500 nm for 0.01 second to 3 minutes, for example. By curing the first liquid crystal composition layer, the thin film of the first cholesteric liquid crystal resin is formed on the supporting body.

(Production of Pigment Using Thin Film of First Cholesteric Liquid Crystal Resin)

The method of peeling off from the supporting body, and crushing of the thin film of the first cholesteric liquid crystal resin is not limited to any particular method. Examples of such a method, however, may include a method described in Japanese Patent Application Laid-Open No. 2015-27743 A. In this method, the thin film of the first cholesteric liquid crystal resin is peeled off from the supporting body using a device for producing flaked pieces shown in FIG. 1. A method for peeling off the thin film of the first cholesteric liquid crystal resin using the device shown in FIG. 1 will be described in the following. Hereinafter, the "thin film of the first cholesteric liquid crystal resin" is also referred to simply as a "first resin thin film".

Figure 2:
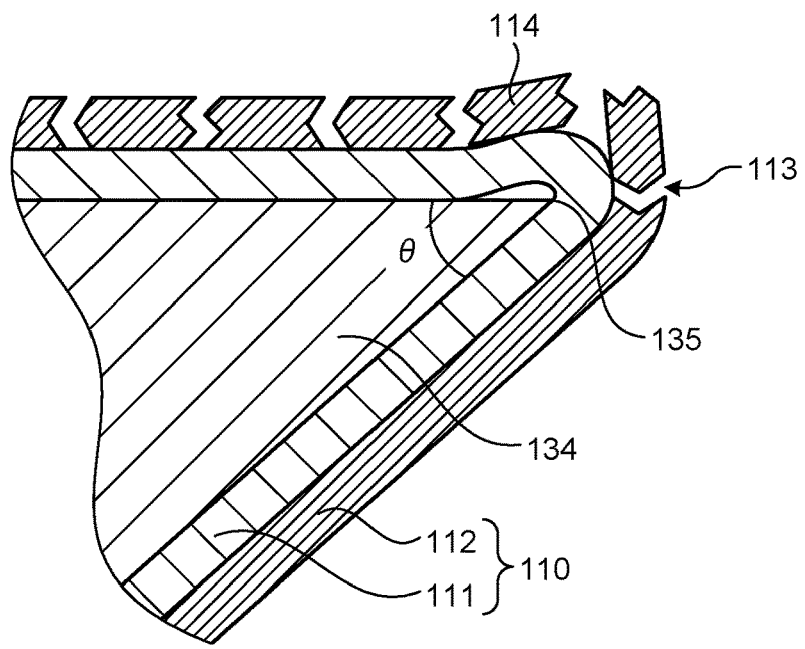
FIG. 2 is a cross-sectional view schematically illustrating a cross-section obtained when a corner portion of a bar in the production device shown in FIG. 1 is cut along a plane perpendicular to the width direction of a supporting body.

FIG. 1 is a front view schematically illustrating a device for producing flaked pieces of a resin thin film used in the production of the pigment composition of the present invention. A device 100 for producing flaked pieces shown in FIG. 1 includes: a film delivery unit 120 that is capable of delivering a multilayered film 110 including a supporting body 111 and a first resin thin film (see 112 in FIG. 2); a peeling unit 130 that is capable of peeling off the first resin thin film 112 from the delivered multilayered film 110; and a recovery unit 140 that is capable of recovering the supporting body 111 from which the first resin thin film 112 has been peeled off.

The peeling unit 130 includes: a bar 134 which has an acute-angled corner portion 135; and a nozzle 136 provided immediately at downstream of the corner portion 135 so as to be capable of spraying air. The angle of the corner portion 135 of the bar 134 is set so that the multilayered film 110 can be folded back at an angle θ. The corner portion has a chamfered structure.

Peeling of the first resin thin film using the device 100 may be performed as follows. The multilayered film 110 is mounted to the film delivery unit 120 in such a direction that the multilayered film 110 can be folded back at the corner portion 135 of the bar 134 with the first resin thin film 112 being disposed on the outside of the supporting body 111. The multilayered film 110 is then delivered from the film delivery unit 120 with tension being applied to the multilayered film 10 by the film recovery unit 140 in a conveying direction.

The multilayered film 110 delivered from the film delivery unit 120 enters a peeling chamber 131 through a slit 132, and is folded back at the corner portion 135 of the bar 134. The supporting body 111 bent at the corner portion 135 usually causes no breakage. The first resin thin film 112 bent at the corner portion 135, on the other hand, causes stress due to its bend deformation. Such stresses break the first resin thin film 112, thereby forming cracks 113. After that, the cracked first resin thin film 112 is peeled off and blown off by air sprayed from the nozzle 136, thus obtaining flaked pieces 114. Part of the flaked pieces 114 are separated from the supporting body 111 and sent to a recovery path entraining the flow of air sprayed by the nozzle 136. Another part of the flaked pieces 114 are sent together with the supporting body 111 while situated on the supporting body 111 or attached to the supporting body 111 due to forces such as electrostatic attractive force, for example.

The supporting body 111, from which the first resin thin film 112 has been peeled off at the corner portion 135 of the bar 134, is conveyed in a downstream direction. As shown in FIG. 1, when the supporting body 111 comes to the position where the nozzle 136 is installed, air being sprayed from the nozzle 136 is blown onto the portions of the first resin thin film 112 where the cracks are formed. The flaked pieces 114 included in the portions of the first resin thin film 112 where the cracks are formed are blown off by the air and sent to the recovery path 137. The first resin thin film (not shown) that has cracks 113 formed therein but remains on the supporting body 111 without being peeled off from the supporting body 111 is also peeled off from the supporting body 111 by the pressure of air sprayed from the nozzle 136. The flaked pieces 114 thus obtained are sent to the recovery path 137.

The flaked pieces 114 sent to the recovery path 137 are sent to a recovery device (not shown) by an air current and recovered. The supporting body 111 from which the first resin thin film 112 has been peeled off is conveyed to the film recovery unit 140 through a slit 133, taken up by a winding core 141, and recovered.

By pulverizing the flaked pieces of the first cholesteric liquid crystal resin which have been peeled off from the supporting body, the first cholesteric liquid crystal pigment which has a desired particle diameter is obtained. Such pulverization is usually performed with a pulverizer.

Examples of such a pulverizer may include a ball mill, a bead mill, a roll mill, a rod mill, a jet mill, and a grindstone type pulverizer.

(Production of Second Cholesteric Liquid Crystal Pigment)

The second cholesteric liquid crystal pigment may be produced by: forming a thin film of a second cholesteric liquid crystal resin on a supporting body; peeling off the thin film of the second cholesteric liquid crystal resin from the supporting body; and crushing the thin film of the second cholesteric liquid crystal resin.

(Production of Thin Film of Second Cholesteric Liquid Crystal Resin)

In the production of the thin film of the second cholesteric liquid crystal resin, the thin film of the second cholesteric liquid crystal resin is formed by curing a layer of the second liquid crystal composition with a pitch of its helical structure being altered gradually by subjecting this layer to light irradiation and/or heating treatment one or more times instead of forming the thin film of the first cholesteric liquid crystal resin by curing the layer of the first liquid crystal composition in the aforementioned "Production of thin film of first cholesteric liquid crystal resin".

The operation of curing the layer of the second liquid crystal composition with a pitch of its helical structure being altered gradually by subjecting this layer to the light irradiation and/or heating treatment one or more times is an operation in which the reflection band of the thin film of the cholesteric liquid crystal resin is extended. Thus, such an operation is referred to as a bandwidth broadening treatment. Even with a thin film of the cholesteric liquid crystal resin which only has a small thickness of 5 μm or less, for example, a wide reflection band can be achieved by performing the bandwidth broadening treatment.

(Production of Pigment Using Thin Film of Second Cholesteric Liquid Crystal Resin)

Peeling-off and crushing of the thin film of the second cholesteric liquid crystal resin may be performed by using the thin film of the second cholesteric liquid crystal resin instead of the thin film of the first cholesteric liquid crystal resin (the first resin thin film) in the above-mentioned "peeling-off and crushing of the thin film of the first cholesteric liquid crystal resin".

(2. Ink Composition)

The ink composition includes the pigment composition of the present invention and a binder resin.

The binder resin contains a polymer, and examples of such a polymer may include a polyester-based polymer, an acrylic polymer, a polystyrene-based polymer, a polyamide-based polymer, a polyurethane-based polymer, a polyolefin-based polymer, a polycarbonate-based polymer, and a polyvinyl-based polymer. As the binder resin, one type thereof may be solely used, and two or more types thereof may also be used in combination at any ratio.

The method for producing an ink composition of the present invention is not particularly limited and the production may be performed by mixing the above-mentioned respective components.

The ink composition of the present invention may constitute an identification medium by performing printing with the ink composition on a substrate to form an ink layer and then curing the ink layer. The material of the substrate for use in forming the ink layer is not particularly limited, and examples thereof may include a resin, a metal, glass, and paper.

The printing method of the ink composition is not particularly limited, and examples thereof may include a screen printing method, a gravure printing method, a flexographic printing method, a letterpress printing method, and an offset printing method.

The curing treatment of the ink layer may be performed by heating or energy ray irradiation one or more times. Examples of the heat treatment may include a heat treatment at 150° C. or higher. By the heat curing of the ink layer as a result of the heat treatment, it is possible to obtain an identification medium in which a printing layer containing the pigment composition of the present invention is formed on a substrate. Examples of the energy rays may include ultraviolet rays, visible light, and other electromagnetic waves. Specifically, the energy ray irradiation may be performed by irradiating light having a wavelength of 200 to 500 nm for 0.01 second to 3 minutes, for example. By the curing treatment of the ink layer, it is possible to obtain an identification medium in which a printing layer containing the pigment composition of the present invention is formed on a substrate.

(3. Identification Medium)

The identification medium of the present invention includes a binder resin and a pigment dispersed in the binder resin. The pigment contained in the identification medium is the pigment composition of the present invention.

The identification medium may take a form including: a layer containing a binder resin and the pigment composition of the present invention dispersed in the binder resin; and an optional layer. Examples of the optional layer may include a substrate and a tackiness layer. Examples of the material of the substrate may include the materials described in Chapter 2.

In a case where the identification medium includes an optional layer on a side from which an observer visually recognizes, the optional layer is preferably a layer having high light transmittance. The total light transmittance of the layer is preferably 70% or more. Furthermore, the layer preferably has a small in-plane retardation Re (for example, 5 nm or less).

(Use Application of Identification Medium)

The identification medium is suitably used for identifying the authenticity of an article, for example, by being pasted or transferred to the article. Examples of an article whose authenticity is to be identified may include articles such as cash vouchers, gift certificates, tickets, certificates, and security cards. The identification medium may be used also in the form of, for example, a label or a sticker for identifying authenticity.

(4. Method for Identifying Authenticity of Identification Medium)

The method for determining the authenticity of an identification medium according to the present invention includes: a step 1 of observing reflected light from the identification medium via a counterclockwise circular polarizing plate and a clockwise circular polarizing plate to determine whether a difference exists in at least one of hue, lightness, and saturation of the reflected light; a step 2 of observing the identification medium by naked eye to determine whether the color originating from the second cholesteric liquid crystal pigment is visually recognizable; and a step 3 of observing the identification medium with a microscope to determine whether the color originating from the first cholesteric liquid crystal pigment and the color originating from the second cholesteric liquid crystal pigment are both visually recognizable.

(Step 1)

The step 1 is a step of observing reflected light from the identification medium via the counterclockwise circular polarizing plate and the clockwise circular polarizing plate to determine whether a difference exists in at least one of hue, lightness, and saturation of the reflected light.

As the identification medium, an identification medium containing a binder resin and a pigment dispersed in the binder resin with the pigment being the pigment composition of the present invention is used. Reflected light from such an identification medium is observed via the counterclockwise circular polarizing plate and the clockwise circular polarizing plate. The reflected light is reflected light obtained when the identification medium is irradiated with natural light. Natural light means unpolarized light, and may be sunlight or artificial light.

Polarized light reflected by the identification medium is as follows depending on twist directions of the first cholesteric liquid crystal pigment and the second cholesteric liquid crystal pigment contained in the pigment composition of the present invention.

(1) When twist directions of the first cholesteric liquid crystal pigment and the second cholesteric liquid crystal pigment are identical to each other: the identification medium reflects only circularly polarized light which has the same direction as the twist directions of the first cholesteric liquid crystal pigment and the second cholesteric liquid crystal pigment.

(2) When twist directions of the first cholesteric liquid crystal pigment and the second cholesteric liquid crystal pigment are different from each other: the identification medium reflects one type of circularly polarized light which has the same direction as the twist direction of the first cholesteric liquid crystal pigment, and reflects the other type of circularly polarized light which has the same direction as the twist direction of the second cholesteric liquid crystal pigment.

For the aforementioned case (1), when the identification medium is observed with the counterclockwise circular polarizing plate and the clockwise circular polarizing plate, light reflected by the first cholesteric liquid crystal pigment and the second cholesteric liquid crystal pigment contains only one type of circularly polarized light. Thus, the reflected light from the identification medium is visually recognized with one of the circular polarizing plates that allows the one type of circularly polarized light to pass therethrough, and the reflected light from the identification medium is visually unrecognized or difficult to be visually recognized with the other circular polarizing plate.

Accordingly, when the reflected light from the identification medium is observed with the counterclockwise circular polarizing plate and the clockwise circular polarizing plate, the identification medium can be determined as being authentic if there is a difference in at least one of hue, lightness, and saturation of the reflected light from the identification medium via the counterclockwise circular polarizing plate and the clockwise circular polarizing plate.

If there is no difference in hue, lightness, and saturation of the reflected light from the identification medium via the counterclockwise circular polarizing plate and the clockwise circular polarizing plate, on the other hand, it can be determined that the identification medium has no selective reflection function that selectively reflects circularly polarized light, and thus the identification medium is inauthentic.

For the aforementioned case (2), when the identification medium is observed with the counterclockwise circular polarizing plate and the clockwise circular polarizing plate, one of the circular polarizing plates allows to pass therethrough light that has been reflected by the first cholesteric liquid crystal pigment, and does not allow to pass therethrough light that has been reflected by the second cholesteric liquid crystal pigment. Thus, when the identification medium is observed from the vicinity of the front direction with the one of the circular polarizing plates, light reflected by the first cholesteric liquid crystal pigment is visually recognized as reflected light from the identification medium. However, light reflected by the second cholesteric liquid crystal resin does not pass through the one of the circular polarizing plates, and therefore the reflected light from the identification medium is visually unrecognized or difficult to be visually recognized.

The other one of the circular polarizing plates does not allow light reflected by the first cholesteric liquid crystal pigment to pass therethrough, and allows light reflected by the second cholesteric liquid crystal pigment to pass therethrough.

Thus, when the identification medium is observed from the vicinity of the front direction with the other one of the circular polarizing plates, light reflected by the first cholesteric liquid crystal pigment does not pass through the other one of the circular polarizing plates, and the light reflected by the second cholesteric liquid crystal pigment is visually recognized as reflected light from the identification medium.

If there is no difference in hue, lightness, and saturation of the reflected light from the identification medium via the counterclockwise circular polarizing plate and the clockwise circular polarizing plate, it can be determined that the identification medium has no selective reflection function that selectively reflects circularly polarized light, and thus the identification medium is inauthentic.

(Step 2)

The step 2 is a step of observing the identification medium by naked eye to determine whether the color originating from the second cholesteric liquid crystal pigment is visually recognizable.

The pigment composition of the present invention contained in the identification medium includes, in addition to the second cholesteric liquid crystal pigment, the first cholesteric liquid crystal pigment in an amount that is more than 0% by weight and equal to or less than 30% by weight relative to the total amount of the first cholesteric liquid crystal pigment and the second cholesteric liquid crystal pigment. When such an identification medium of the present invention is observed by naked eye, the color originating from the second cholesteric liquid crystal pigment is visually recognizable, but the color originating from the first cholesteric liquid crystal pigment is visually unrecognized or difficult to be visually recognized as will be explained below.

In the pigment composition of the present invention, since the containing amount of the first cholesteric liquid crystal pigment is smaller than the containing amount of the second cholesteric liquid crystal pigment, it becomes difficult to visually recognize the circularly polarized component reflected by the first cholesteric liquid crystal pigment under naked-eye observation. Thus, when the identification medium is observed by naked eye, the color originating from the second cholesteric liquid crystal pigment is visually recognizable, but the color originating from the first cholesteric liquid crystal pigment is visually unrecognized or difficult to be visually recognized.

When the color originating from the second cholesteric liquid crystal pigment cannot be visually recognized and when the color originating from the second cholesteric liquid crystal pigment and the color originating from the first cholesteric liquid crystal pigment can be recognized to a degree distinguishable from each other under naked-eye observation of the identification medium, the identification medium can be determined as being inauthentic.

Whether the color originating from the second cholesteric liquid crystal pigment and the color originating from the first cholesteric liquid crystal pigment can be recognized to a degree distinguishable from each other may be quantitatively evaluated using, for example, a spectrophotometer. As a color system used for the quantitative evaluation, any system may be used. For example, the XYZ color system, or the L*a*b* color system may be used.

(Step 3)

The step 3 is a step of observing the identification medium with a microscope to determine whether the color originating from the first cholesteric liquid crystal pigment and the color originating from the second cholesteric liquid crystal pigment are both visually recognizable.

An optical microscope may be used as the microscope used in the step 3. A magnification in the microscopic observation is preferably 50 or more, and more preferably 100 or more, and is preferably 1,000 or less, and more preferably 500 or less. When the magnification in the microscopic observation is equal to or more than the aforementioned lower limit value, it becomes easier to visually recognize the color originating from the first cholesteric liquid crystal pigment.

By observing the identification medium of the present invention with a microscope, the color originating from the first cholesteric liquid crystal pigment and the color originating from the second cholesteric liquid crystal pigment can be both visually recognized, both when the twist directions of the first cholesteric liquid crystal pigment and the second cholesteric liquid crystal pigment are the same and when different from each other.

Thus, when either one or both of the color originating from the first cholesteric liquid crystal pigment and the color originating from the second cholesteric liquid crystal pigment cannot be visually recognized under microscopic observation, the identification medium can be determined as being inauthentic.

(Advantageous Effects of Present Invention)

The identification medium of the present invention contains the pigment composition which contains, at a specific ratio: the first cholesteric liquid crystal pigment which has a center wavelength of a selective reflection band within a wavelength range of 400 nm or more and 800 nm or less, and a selective reflection bandwidth of 150 nm or less; and the second cholesteric liquid crystal pigment which has a selective reflection bandwidth of 200 nm or more within a wavelength range of 400 nm or more and 800 nm or less. Thus, the color originating from the first cholesteric liquid crystal pigment having a narrower selective reflection band is visually unrecognized or difficult to be visually recognized under naked-eye observation, but can be made visually recognizable under microscopic observation. Accordingly, criteria for determining authenticity can be improved, thus increasing the anti-counterfeit effect.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure in the atmospheric air, unless otherwise specified.

(Evaluation Method)

(Center Wavelength of Selective Reflection Band)

Selective reflection bands and center wavelengths of the selective reflection bands of the pigments (pigments A to E) used in the respective examples were measured in accordance with the following method.

In each of multilayered films A to E obtained in the following Production Examples 1 to 5, after the layer of the cholesteric liquid crystal resin was bonded to a black PET film with a tackiness layer (manufactured by Tomoegawa Co., Ltd.) via the tacky layer, a supporting body was peeled off therefrom, so that the liquid crystal resin layer was transferred onto the black PET film.

Subsequently, the reflection spectrum of the liquid crystal resin layer at an incidence angle of 5° was measured using a spectrophotometer ("V570" manufactured by JASCO Corporation). As a selective reflection bandwidth, a half width of the selective reflection band was determined from the obtained reflection spectrum. Specifically, a base having the minimum strength and a peak having the maximum strength were determined in the reflection spectrum; a wavelength $\lambda 1$ on the shorter wavelength side of the peak and a wavelength $\lambda 2$ on the longer wavelength side of the peak, indicating a strength equal to the minimum strength+(the maximum strength−the minimum strength)/2, were obtained; and the average value $(\lambda 1+\lambda 2)/2$ of these wavelengths was adopted as the center wavelength of the selective reflection band of the cholesteric liquid crystal resin (pigment). A range from the wavelength $\lambda 2$ to the wavelength $\lambda 1$ was adopted as the selective reflection band, and the width thereof (a difference between $\lambda 2$ and $\lambda 1$: $\Delta \lambda$) was adopted as the selective reflection bandwidth.

(Measurement of Average Particle Diameter)

The particle size distribution of each pigment was measured using a laser scattering method, and the average particle diameter was measured from the particle size distribution. As the measurement device, a laser diffraction/scattering type particle diameter distribution measurement device (LA-960 manufactured by Horiba Ltd.) was used.

(Determination of Twist Directions)

The twist direction of each pigment was determined by observing, via the clockwise and counterclockwise circular polarizing plates, reflected light obtained when unpolarized light was incident on the multilayered films A to E (films containing the pigments) obtained in Production Examples 1 to 5. Specifically, the multilayered film was irradiated with unpolarized light from the observer's side, and reflected light reflected at the multilayered film and reaching the observer's side was observed. When such reflected light was clockwise circularly polarized light, the pigment was determined as having a clockwise twist. When such reflected light was counterclockwise circularly polarized light, the pigment was determined as having a counterclockwise twist.

(Evaluation Under Naked-Eye Observation)

The identification medium to be evaluated was observed by naked eye under natural light, and whether the color originating from the first cholesteric liquid crystal pigment is recognizable by naked eye was evaluated. When the color was recognizable by naked eye, it was determined as being naked-eye recognizable. When the color was difficult to be recognized or when the color was unrecognizable by naked eye, it was determined as being naked-eye unrecognizable.

(Evaluation with Spectrophotometer)

The reflection spectrum at an incidence angle of 5° was measured from the side with the printed layer of the identification medium to be evaluated using the spectrophotometer (V570 manufactured by JASCO Corporation). The obtained reflection spectrum was used to calculate L*a*b* chromaticity coordinates in accordance with the following method. A color difference Δa*b* was further calculated with the chromaticity of the identification medium according to Comparative Example 1 containing only the second cholesteric liquid crystal pigment (pigment B) being used as a reference.

(Step. 1)

The measured reflection spectrum R(λ) and the following Equations (11) to (13) were used to calculate tristimulus values X, Y, and Z.

(Mathematical formulae 1).

$$X = \Sigma_{n=0}^{80} S(380+5n) * R(380+5n) * x(380+5n) \quad (11)$$

$$Y = \Sigma_{n=0}^{80} S(380+5n) * R(380+5n) * y(380+5n) \quad (12)$$

$$Z = \Sigma_{n=0}^{80} S(380+5n) * R(380+5m) * z(380+5n) \quad (13)$$

S(λ) herein denotes the spectrum of a light source, and the value of a C light source was used in the present example. x(λ), y(λ), and z(λ) denote color matching functions.

(Step. 2)

The tristimulus values X, Y, and Z calculated in STEP. 1 were used to calculate lightness L*, a*, and b* in the CIE 1976 L*ab* color space. The following Equations (14) to (16) were used for the calculation.

(Mathmatical formulae 2)

$$L^* = 116\left(\frac{X}{X_n}\right)^{1/3} - 16 \quad (14)$$

$$a^* = 500\left\{f\left(\frac{X}{X_n}\right) - f\left(\frac{Y}{Y_n}\right)\right\} \quad (15)$$

$$b^* = 200\left\{f\left(\frac{Y}{Y_n}\right) - f\left(\frac{Z}{Z_n}\right)\right\} \quad (16)$$

$X_n$, $Y_n$, and $Z_n$ denote tristimulus values calculated in Equations (17) to (19), respectively.

(Mathematical formulae 3)

$$X_n = \Sigma_{n=0}^{80} S(380+5n) * x(380+5n) \quad (17)$$

$$Y_n = \Sigma_{n=0}^{80} S(380+5n) * y(380+5n) \quad (18)$$

$$Z_n = \Sigma_{n=0}^{80} S(380+5n) * z(380+5n) \quad (19)$$

$f(X/X_n)$, $f(Y/Y_n)$, and $f(Z/Z_n)$ are represented by Equations (20) to (22), respectively.

(Mathematical formulae 4)

(Mathmatical formulae 4)

$$f\left(\frac{X}{X_n}\right) = \left(\frac{X}{X_n}\right)^{1/3} \quad \frac{X}{X_n} > 0.008856 \quad (20)$$

$$f\left(\frac{X}{X_n}\right) = 7.787\left(\frac{X}{X_n}\right) + \frac{16}{116} \quad \frac{X}{X_n} \leq 0.008856$$

$$f\left(\frac{Y}{Y_n}\right) = \left(\frac{Y}{Y_n}\right)^{1/3} \quad \frac{Y}{Y_n} > 0.008856 \quad (21)$$

$$f\left(\frac{Y}{Y_n}\right) = 7.787\left(\frac{Y}{Y_n}\right) + \frac{16}{116} \quad \frac{Y}{Y_n} \leq 0.008856$$

$$f\left(\frac{Z}{Z_n}\right) = \left(\frac{Z}{Z_n}\right)^{1/3} \quad \frac{Z}{Z_n} > 0.008856 \quad (22)$$

$$f\left(\frac{Z}{Z_n}\right) = 7.787\left(\frac{Z}{Z_n}\right) + \frac{16}{116} \quad \frac{Z}{Z_n} \leq 0.008856$$

Furthermore, the obtained values of a* and b* in each example were used to calculate Δa*b* using the following Equation (23).

$$\Delta ab^* = ((a^*_1 - a^*_2)^2 + (b^*_1 - b^*_2)^2)^{1/2} \quad (23)$$

In Equation (23), $a^*_1$ represents a* in each example, $a^*_2$ represents a* in Comparative Example 1, $b^*_1$ represents b* in each example, and $b^*_2$ represents b* in Comparative Example 1.

When Δa*b* is less than 10, the difference between the color originating from the first cholesteric liquid crystal pigment and the color originating from the second cholesteric liquid crystal pigment is difficult to recognize. When Δa*b* is equal to or less than 5, the aforementioned difference between the colors becomes even more difficult to recognize. When Δa*b* is equal to or more than 10, the difference between the color originating from the first cholesteric liquid crystal pigment and the color originating from the second cholesteric liquid crystal pigment can be recognized.

(Microscopic Observation)

The printed surface of the identification medium was observed under magnification using an optical microscope (a 100-fold magnification). Whether the color originating from the first cholesteric liquid crystal pigment is visually recognizable, and what color it looks like if visually recognizable were determined under microscopic observation.

(Observation with Circular Polarizing Plates)

Reflected light from the printed surface of the identification medium was observed via the counterclockwise circular polarizing plate and the clockwise circular polarizing plate. Whether the reflected light is visually recognizable, and what color it looks like if visually recognizable were determined by naked eye observation.

(Production Example 1: Production of Multilayered Film A Serving as Material for Pigment A)

As the supporting body, a polyethylene terephthalate (PET) film ("Cosmoshine (registered trademark) A4100", thickness: 100 μm, manufactured by Toyobo Co., Ltd.) was prepared, and one surface thereof was subjected to a rubbing treatment.

Materials shown in the following table were mixed to prepare a liquid crystal composition (coating liquid L1) containing a liquid crystal compound. The liquid crystal compound (compound (B3)) and the compound of the formula (2) (compound (A2)) are compounds represented by the following formula, respectively.

(Chemical formulae 4)

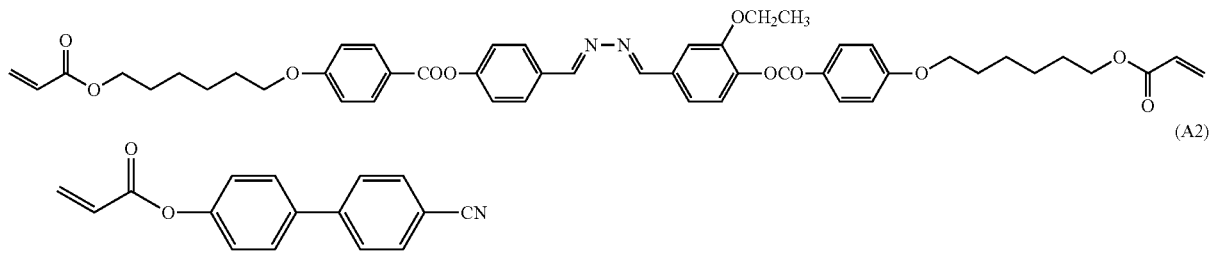

TABLE 1

| Coating liquid L1 | | |
| --- | --- | --- |
| Liquid crystal compound | Compound (B3) | 16.02 parts by wt |
| Compound of formula (2) | Compound (A2) | 4.00 parts by wt |
| Chiral agent | "LC756" from BASF | 1.29 parts by wt |
| Polymerization initiator | "IRGACURE184" from BASF | 0.66 parts by wt |
| Leveling agent | "Surflon S420" from AGC Seimi Chemical | 0.04 parts by wt |
| Solvent | Cyclopentanone | 77.99 parts by wt |

(1-1. Application Process)

The coating liquid L1 was applied onto the rubbed surface of the supporting body to form a layer (coating layer) of the liquid crystal composition. Application of the coating liquid L1 was performed with a die coater while adjusting the discharge amount so that the film thickness of the layer of the liquid crystal composition before drying became 15 μm.

(1-2. Drying Process)

Subsequently, a drying process was performed in which the layer of the liquid crystal composition formed on the supporting body was heated in an oven at 140° C. for 2 minutes.

(1-3. Polymerization Process)

After the drying process, a process of irradiating the liquid crystal composition with ultraviolet rays using a high-pressure mercury lamp from the side with the layer of the liquid crystal composition was performed to polymerize the layer of the liquid crystal composition. The conditions of the ultraviolet irradiation were set such that the irradiation was performed in a nitrogen gas atmosphere with an oxygen concentration of 400 ppm or less, the illuminance at a wavelength of 365 nm was 280 mW/cm², and the exposure dose at a wavelength of 365 nm was 2300 mJ/cm².

By performing the polymerization process to cure the layer of the liquid crystal composition with cholesteric regularity, the cholesteric liquid crystal composition was cured while maintaining its cholesteric regularity, thereby forming a thin film of the cholesteric liquid crystal resin which is a layer of a resin with cholesteric regularity. As a result, a multilayered film A with a configuration of (supporting body)/(thin film of cholesteric liquid crystal resin) was obtained. The thickness of the cholesteric liquid crystal resin thin film of the multilayered film A was 3 μm.

(Production Example 2: Production of Multilayered Film B Serving as Material for Pigment B)

(2-1. Application Process)

A layer of a liquid crystal composition was formed on the supporting body by performing the same operations as those described in (1-1) of Production Example 1, except that a coating liquid L2 obtained by mixing materials shown in the following table was used instead of the coating liquid L1 in (1-1. Application process) of Production Example 1, and the discharge amount was adjusted so that the film thickness of the coating layer before drying was 25 μm.

TABLE 2

| Coating liquid L2 | | |
| --- | --- | --- |
| Liquid crystal compound | Compound (B3) | 16.09 parts by wt |
| Compound of formula (2) | Compound (A2) | 4.02 parts by wt |
| Chiral agent | "LC756" from BASF | 1.20 parts by wt |
| Polymerization initiator | "IRGACURE184" from BASF | 0.66 parts by wt |
| Leveling agent | "Surflon S420" from AGC Seimi Chemical | 0.04 parts by wt |
| Solvent | Cyclopentanone | 77.99 parts by wt |

(2-2. Drying Process)

Subsequently, a drying process was performed in which the layer of the liquid crystal composition formed on the supporting body was heated in an oven at 140° C. for 2 minutes.

(2-3. Bandwidth Broadening Treatment)

After the drying process, a process consisting of ultraviolet irradiation treatment using a high-pressure mercury lamp followed by heating treatment at 100° C. for 1 minute was performed twice.

The conditions of the first ultraviolet irradiation treatment were set such that the irradiation was performed in an atmospheric air, the illuminance at a wavelength of 365 nm was 5 mW/cm², and the exposure dose at a wavelength of 365 nm was 300 mJ/cm. The conditions of the second ultraviolet irradiation treatment were set such that the irradiation was performed in an atmospheric air, the illuminance at a wavelength of 365 nm was 30 mW/cm², and the exposure dose at a wavelength of 365 nm was 1,800 mJ/cm². Heating treatment was performed by an oven.

(2-4. Polymerization Process)

After the bandwidth broadening treatment, a process of irradiating the liquid crystal composition with ultraviolet rays using a high-pressure mercury lamp from the side with the layer of the liquid crystal composition was performed to polymerize the layer of the liquid crystal composition. The conditions of the ultraviolet irradiation were set such that the irradiation was performed in a nitrogen gas atmosphere with an oxygen concentration of 400 ppm or less, the illuminance at a wavelength of 365 nm was 280 mW/cm², and the exposure dose at a wavelength of 365 nm was 2, 300 mJ/cm².

By performing the polymerization process to cure the layer of the liquid crystal composition with cholesteric regularity, the cholesteric liquid crystal composition was cured while maintaining its cholesteric regularity, thereby forming a thin film of the cholesteric liquid crystal resin which is a layer of a resin with cholesteric regularity. As a result, a multilayered film B with a configuration of (supporting body)/(thin film of cholesteric liquid crystal resin) was obtained. The thickness of the thin film of the cholesteric liquid crystal resin in the multilayered film B was 5 μm.

(Production Example 3: Production of Multilayered Film C Serving as Material for Pigment C)

A multilayered film C was obtained by performing the same operations as those described in Production Example 1, except that a coating liquid L3 obtained by mixing materials shown in the following table was used instead of the coating liquid L1 in Production Example 1. The thickness of the thin film of the cholesteric liquid crystal resin in the multilayered film C was 3 μm.

TABLE 3

| Coating liquid L3 | | |
|---|---|---|
| Liquid crystal compound | Compound (B3) | 15.80 parts by wt |
| Compound of formula (2) | Compound (A2) | 3.95 parts by wt |
| Chiral agent | "LC756" from BASF | 1.56 parts by wt |
| Polymerization initiator | "IRGACURE184" from BASF | 0.66 parts by wt |
| Leveling agent | "Surflon S420" from AGC Seimi Chemical | 0.04 parts by wt |
| Solvent | Cyclopentanone | 77.99 parts by wt |

(Production Example 4: Production of Multilayered Film D Serving as Material for Pigment D)

A multilayered film D was obtained by performing the same operations as those described in Production Example 1, except that a coating liquid L4 obtained by mixing materials shown in the following table was used instead of the coating liquid L1 in Production Example 1. The thickness of the thin film of the cholesteric liquid crystal resin in the multilayered film D was 3 μm.

TABLE 4

| Coating liquid L4 | | |
|---|---|---|
| Liquid crystal compound | Compound (B3) | 16.17 parts by wt |
| Compound of formula (2) | Compound (A2) | 4.04 parts by wt |
| Chiral agent | "LC756" from BASF | 1.10 parts by wt |
| Polymerization initiator | "IRGACURE184" from BASF | 0.66 parts by wt |
| Leveling agent | "Surflon S420" from AGC Seimi Chemical | 0.04 parts by wt |
| Solvent | Cyclopentanone | 77.99 parts by wt |

(Production Example 5: Production of Multilayered Film E Serving as Material for Pigment E)

A multilayered film E was obtained by performing the same operations as those described in Production Example 1, except that a coating liquid L5 obtained by mixing materials shown in the following table was used instead of the coating liquid L1 in Production Example 1. The thickness of the thin film of the cholesteric liquid crystal resin in the multilayered film E was 3 μm.

TABLE 5

| Coating liquid L5 | | |
|---|---|---|
| Liquid crystal compound | Compound (B3) | 16.22 parts by wt |
| Compound of formula (2) | Compound (A2) | 4.05 parts by wt |
| Chiral agent | Compound (3) | 1.05 parts by wt |
| Polymerization initiator | "IRGACURE184" from BASF | 0.66 parts by wt |
| Leveling agent | "Surflon S420" from AGC Seimi Chemical | 0.04 parts by wt |
| Solvent | Cyclopentanone | 77.98 parts by wt |

The compound (3) contained in the coating liquid L5 is a compound represented by the following formula.

(Chemical formula 5)

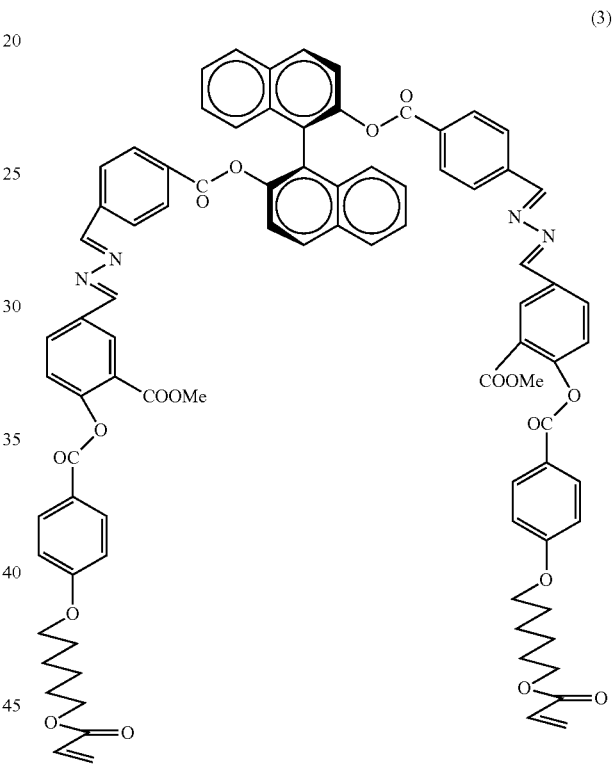

(3)

(Production Example 6. Preparation of Pigments a to E)
(Production of Flaked Pieces of Thin Film of Cholesteric Liquid Crystal Resin)

Using the multilayered films A to E produced in Production Examples 1 to 5, flaked pieces of thin films of cholesteric liquid crystal resin were produced by the following method using a production device shown in FIG. 1.

As shown in FIG. 1, a production device 100 was prepared which included a film delivery unit 120, a peeling unit 130, and a film recovery unit 140. The peeling unit 130 included a bar 134 with an acute-angled corner portion 135, and a nozzle 136 provided immediately at downstream of the corner portion 135 and which is capable of spraying air. In this operation, the angle of the corner portion 135 of the bar 134 was set so that the multilayered film 110 was able to be folded back at an angle θ (60°). The corner portion had a chamfered structure of R=0.2 mm to 0.3 mm.

The multilayered film 110 was mounted to the film delivery unit 120 in such a direction that the multilayered film 110 was able to be folded back at the corner portion 135 of the bar 134 with the thin film 112 of the first cholesteric liquid crystal resin (or the thin film of the second cholesteric liquid crystal resin) being disposed on the outside of the supporting body 111 (PET film). Then, the multilayered film 110 was delivered from the film delivery unit 120 with tension being applied to the multilayered film 10 by the film recovery unit 140 in a conveying direction. In this operation, the magnitude of the tension applied to the multilayered film 110 was set to 80 N/m. Air was sprayed from the nozzle 436 with a pressure of 0.5 MPa.

The multilayered film 110 was folded back at the corner portion 135 of the bar 134, so that many cracks were formed. After that, the thin film 112 of the first cholesteric liquid crystal resin (or the thin film of the second cholesteric liquid crystal resin), in which cracks were formed, was peeled off and blown off by air sprayed from the nozzles 136, thus obtaining flaked pieces 111A.

(Production of Pigments)

The flaked pieces 111A were collected, pulverized by a cutter mill, and classified using a 51-μm sieve, and only the particles passed through the sieve were collected as a pigment. The average particle diameter of the obtained pigment, the center wavelength of the selective reflection band, the selective reflection band, and the selective reflection bandwidth were measured. The results are shown in Tables 5 and 6. From these measurement results, the pigments A, C, D, and E were the first cholesteric liquid crystal pigments which had a center wavelength of the selection reflection band within the wavelength range of 400 nm or more and 800 nm or less and the selective reflection bandwidth of 150 nm or less. The pigment B was the second cholesteric liquid crystal pigment with a selective reflection bandwidth of 200 nm or more within a wavelength range of 400 nm or more and 800 nm or less.

The color originating from the pigment A was green, the color originating from the pigment B was silver, the color originating from the pigment C was blue, the color originating from the pigment D was red, and the color originating from the pigment E was red.

Examples 1 to 7, Comparative Example 2

(Preparation of Ink Composition)

An ink composition was prepared by the following method using the pigment A, C, D or E produced in Production Example 6 as the first cholesteric liquid crystal pigment and the pigment B produced in Production Example 6 as the second cholesteric liquid crystal pigment.

The first cholesteric liquid crystal pigment and the second cholesteric liquid crystal pigment shown in Table 6 and Table 7, and the binder (UV-curable binder, "RAYCURE OP 4300-2" series FG-20SC thick medium manufactured by Jujo Chemical Co., Ltd.) were mixed to prepare an ink composition with a solid content of 10%. The containing amount of the first cholesteric liquid crystal pigment relative to the total amount of the first cholesteric liquid crystal pigment and the second cholesteric liquid crystal pigment was set to the amounts described in Table 6 and Table 7 (described as "Containing amount of first cholesteric liquid crystal pigment" in the tables).

(Production of Identification Media)

The prepared ink composition was screen printed on a substrate (black paper). As the screen plate, a screen plate with 120 lines per inch was used. The printed surface of the substrate was irradiated with ultraviolet rays using a high-pressure mercury lamp to obtain an identification medium. The conditions of the ultraviolet irradiation were set such that the irradiation was performed in a nitrogen-gas atmosphere with an oxygen concentration of 400 ppm or less, the illuminance at a wavelength of 365 nm was 280 mW/cm$^2$, and the exposure dose at a wavelength of 365 nm was 400 mJ/cm$^2$.

The obtained identification medium was subjected to naked-eye observation, spectrophotometer evaluation, microscopic observation and polarizing plate observation.

Comparative Example 1

An identification medium was obtained by the same operations as those of Example 1, except that the first cholesteric liquid crystal pigment was not used in the preparation of the ink composition of Example 1. The obtained identification medium was subjected to naked-eye observation, spectrophotometer evaluation, microscopic observation and polarizing plate observation.

(Results)

The evaluation results of Examples and Comparative Examples, together with the information on the pigments used in each example (type, center wavelength of the selective reflection band, selective reflection band, selective reflection bandwidth, average particle diameter, and twist direction), are shown in the following table.

TABLE 6

|  | Ex. 1 | Ex. 2 | Ex. 3 | Ex. 4 | Ex. 5 |
|---|---|---|---|---|---|
| First cholesteric liquid crystal pigment | | | | | |
| Pigment | Pigment A | Pigment A | Pigment A | Pigment C | Pigment C |
| Center wavelength of selective reflection band (nm) | 542 | 542 | 542 | 459 | 459 |
| Selective reflection band (nm) | 489-594 | 489-594 | 489-594 | 408-509 | 408-509 |
| Selective reflection bandwidth (nm) | 105 | 105 | 105 | 101 | 101 |
| Average particle diameter (μm) | 45 | 45 | 45 | 45 | 45 |
| Twist direction | Clockwise | Clockwise | Clockwise | Clockwise | Clockwise |
| Second cholesteric liquid crystal pigment | | | | | |
| Pigment | Pigment B | Pigment B | Pigment B | Pigment B | Pigment B |
| Center wavelength of selective reflection band (nm) | 598 | 598 | 598 | 598 | 598 |
| Selective reflection band (nm) | 415-780 | 415-780 | 415-780 | 415-780 | 415-780 |
| Selective reflection bandwidth (nm) | 365 | 365 | 365 | 365 | 365 |

TABLE 6-continued

|  | Ex. 1 | Ex. 2 | Ex. 3 | Ex. 4 | Ex. 5 |
| --- | --- | --- | --- | --- | --- |
| Average particle diameter (μm) | 45 | 45 | 45 | 45 | 45 |
| Twist direction | Clockwise | Clockwise | Clockwise | Clockwise | Clockwise |
| First cholesteric liquid crystal pigment content (%) | 25 | 20 | 17 | 25 | 17 |
| Solid content (%) | 10 | 10 | 10 | 10 | 10 |
| Evaluation results | | | | | |
| Naked-eye observation | Unrecognizable | Unrecognizable | Unrecognizable | Unrecognizable | Unrecognizable |
| Spectrophotometer evaluation: a* | −6.1 | −4.9 | −3.0 | 1.9 | 1.5 |
| Spectrophotometer evaluation: b* | 6.5 | 6.1 | 6.0 | −4.8 | −1.8 |
| Spectrophotometer evaluation: Δa*b* | 7.8 | 6.5 | 4.9 | 7.9 | 4.9 |
| Microscopic observation: First cholesteric liquid crystal pigment | Recognizable | Recognizable | Recognizable | Recognizable | Recognizable |
| Microscopic observation: recognized color | Green | Green | Green | Blue | Blue |
| Polarizing plate observation: clockwise circular polarizing plate | Silver | Silver | Silver | Silver | Silver |
| Polarizing plate observation: counterclockwise circular polarizing plate | Unrecognizable | Unrecognizable | Unrecognizable | Unrecognizable | Unrecognizable |

TABLE 7

|  | Ex. 6 | Ex. 7 | Comp. Ex. 1 | Comp. Ex. 2 |
| --- | --- | --- | --- | --- |
| First cholesteric liquid crystal pigment | | | | |
| Pigment | Pigment D | Pigment E |  | Pigment A |
| Center wavelength of selective reflection band (nm) | 636 | 625 |  | 542 |
| Selective reflection band (nm) | 579-693 | 585-666 |  | 489-594 |
| Selective reflection bandwidth (nm) | 114 | 81 |  | 105 |
| Average particle diameter (μm) | 45 | 45 |  | 45 |
| Twist direction | Clockwise | Counter clockwise |  | Clockwise |
| Second cholesteric liquid crystal pigment | | | | |
| Pigment | Pigment B | Pigment B | Pigment B | Pigment B |
| Center wavelength of selective reflection band (nm) | 598 | 598 | 598 | 598 |
| Selective reflection band (nm) | 415-780 | 415-780 | 415-780 | 415-780 |
| Selective reflection bandwidth (nm) | 365 | 365 | 365 | 365 |
| Average particle diameter (μm) | 45 | 45 | 45 | 45 |
| Twist direction | Clockwise | Clockwise | Clockwise | Clockwise |
| First cholesteric liquid crystal pigment content (%) | 17 | 17 |  | 33 |
| Solid content (%) | 10 | 10 | 10 | 10 |
| Evaluation results | | | | |
| Naked-eye observation | Unrecognizable | Unrecognizable | — | Recognizable |
| Spectrophotometer evaluation: a* | 3.3 | 3.0 | 0.9 | −7.3 |
| Spectrophotometer evaluation: b* | 4.8 | 5.5 | 3.0 | 8.8 |
| Spectrophotometer evaluation: Δa*b* | 3.1 | 3.6 |  | 10.0 |
| Microscopic observation: First cholesteric liquid crystal pigment | Recognizable | Recognizable | Unrecognizable | Recognizable |
| Microscopic observation: recognized color | Red | Red | — | Green |
| Polarizing plate observation: clockwise circular polarizing plate | Silver | Silver | Silver | Green |
| Polarizing plate observation: counterclockwise circular polarizing plate | Unrecognizable | Red | Unrecognizable | Unrecognizable |

The following matters are found from the above-described results.

In the identification medium containing the pigment composition of the present invention, a hue difference in the reflected light from the identification medium via the clockwise and counterclockwise circular polarizing plates was recognized under observation with the circular polarizing plates. The color originating from the first cholesteric liquid crystal pigment was visually unrecognized under naked-eye observation, but was visually recognized under microscopic observation. In Comparative Example 2 wherein the containing amount of the first cholesteric liquid crystal pigment is larger than that defined in the present invention, in contrast, the color originating from the first cholesteric liquid crystal pigment was visually recognized under naked-eye observation and under microscopic observation.

On the basis of the aforementioned results, it was found that the present invention can improve criteria for determining authenticity, and thus the anti-counterfeit effect can be increased.

REFERENCE SIGN LIST 100 device for producing flaked pieces of a resin thin film
110 multilayered film
111 supporting body
112 first cholesteric liquid crystal resin thin film
113 cracks
114 flaked pieces
120 film delivery unit
130 peeling unit
131 peeling chamber
132 slit
133 slit
134 bar
135 corner portion of bar
136 nozzle
137 recovery path
140 film recovery unit
141 winding core

The invention claimed is:

1. A pigment composition comprising a mixture of a first cholesteric liquid crystal pigment; and a second cholesteric liquid crystal pigment, wherein:
   at least one of the first cholesteric liquid crystal pigment and the second cholesteric liquid crystal pigment is in flake form,
   an average particle diameter of the flake is 20 μm or more and 120 μm or less,
   the first cholesteric liquid crystal pigment is a pigment having: a center wavelength of a selective reflection band within a wavelength range of 400 nm or more and 800 nm or less; and a selective reflection bandwidth of 150 nm or less;
   the second cholesteric liquid crystal pigment is a pigment having a selective reflection bandwidth of 200 nm or more within a wavelength range of 400 nm or more and 800 nm or less;
   the selective reflection band of the first cholesteric liquid crystal pigment and a selective reflection band of the second cholesteric liquid crystal pigment at least partially overlap with each other; and
   a containing amount of the first cholesteric liquid crystal pigment relative to a total amount of the first cholesteric liquid crystal pigment and the second cholesteric liquid crystal pigment is more than 0% by weight and 30% by weight or less.

2. The pigment composition according to claim 1, wherein the containing amount of the first cholesteric liquid crystal pigment relative to the total amount of the first cholesteric liquid crystal pigment and the second cholesteric liquid crystal pigment is 20% by weight or less.

3. The pigment composition according to claim 1, wherein a selective reflection bandwidth of the first cholesteric liquid crystal pigment is 120 nm or less.

4. The pigment composition according to claim 1, wherein the first cholesteric liquid crystal pigment and the second cholesteric liquid crystal pigment have an identical twist direction.

5. The pigment composition according to claim 1, wherein the first cholesteric liquid crystal pigment and the second cholesteric liquid crystal pigment have twist directions that are different each other.

6. The pigment composition according to claim 1, wherein:
   the first cholesteric liquid crystal pigment is in flake form, and
   an average particle diameter of the flakes of the first cholesteric liquid crystal pigment is 20 μm or more and 120 μm or less.

7. An ink composition comprising: the pigment composition according to claim 1; and a binder resin.

8. An identification medium comprising: a binder resin; and a pigment dispersed in the binder resin, wherein the pigment is the pigment composition according to claim 1.

9. A method for determining authenticity of the identification medium according to claim 8, comprising:
   a step 1 of observing reflected light from the identification medium via a counterclockwise circular polarizing plate and a clockwise circular polarizing plate to determine whether a difference exists in at least one of hue, lightness, and saturation of the reflected light;
   a step 2 of observing the identification medium by naked eye to determine whether a color originating from the second cholesteric liquid crystal pigment is visually recognizable; and
   a step 3 of observing the identification medium with a microscope to determine whether a color originating from the first cholesteric liquid crystal pigment and the color originating from the second cholesteric liquid crystal pigment are both visually recognizable.

* * * * *